United States Patent [19]  [11] 4,187,210
Howard, Jr.  [45] Feb. 5, 1980

[54] HOMOGENEOUS, HIGHLY-FILLED, POLYOLEFIN COMPOSITES

[75] Inventor: Edward G. Howard, Jr., Hockessin, Del.

[73] Assignee: E. I. Du Pont de Nemours and Company, Wilmington, Del.

[21] Appl. No.: 699,942

[22] Filed: Jun. 25, 1976

Related U.S. Application Data

[63] Continuation-in-part of Ser. No. 573,598, Apr. 30, 1975, abandoned, which is a continuation-in-part of Ser. No. 424,820, Dec. 14, 1973, abandoned, which is a continuation-in-part of Ser. No. 424,821, Dec. 14, 1973, abandoned, which is a continuation-in-part of Ser. No. 424,822, Dec. 14, 1973, abandoned, which is a continuation-in-part of Ser. No. 444,295, Feb. 21, 1974, abandoned, which is a continuation-in-part of Ser. No. 529,006, Dec. 2, 1974, abandoned.

[51] Int. Cl.$^2$ ................................................. C08K 9/00
[52] U.S. Cl. ............................... 260/42.14; 260/42.16; 260/42.46; 260/42.53; 260/45.7 R; 264/294; 264/319
[58] Field of Search ............... 260/42.46, 42.14, 42.53, 260/45.7 R, 42.16; 264/294, 319

[56] References Cited

U.S. PATENT DOCUMENTS

| 3,256,236 | 6/1966 | Herman et al. | 260/42.53 |
| 3,297,466 | 1/1967 | Herman et al. | 260/42.53 |
| 3,578,629 | 5/1971 | McManimie | 260/42.14 |
| 3,738,944 | 6/1973 | Candlin et al. | 252/431 R |

FOREIGN PATENT DOCUMENTS 2130677  12/1971  Fed. Rep. of Germany.

*Primary Examiner*—James H. Derrington

[57] ABSTRACT

Solid, homogeneous, particulate, highly-filled polyolefin composites which comprise (a) about 10–75% by weight of polyolefin having an inherent viscosity of at least about 2, and (b) about 25–90% by weight of finely-divided, inorganic filler compound having catalytically-active transition metal compound interacted at its surface, said polyolefin being polymerized onto the surface of said filler, and said composite having a 10-second micronization homogeneity of at least about 50% and a micronization homogeneity index of at least about 20. Methods of preparing these composites and methods of forming objects having outstanding properties from these composites are described.

66 Claims, 3 Drawing Figures

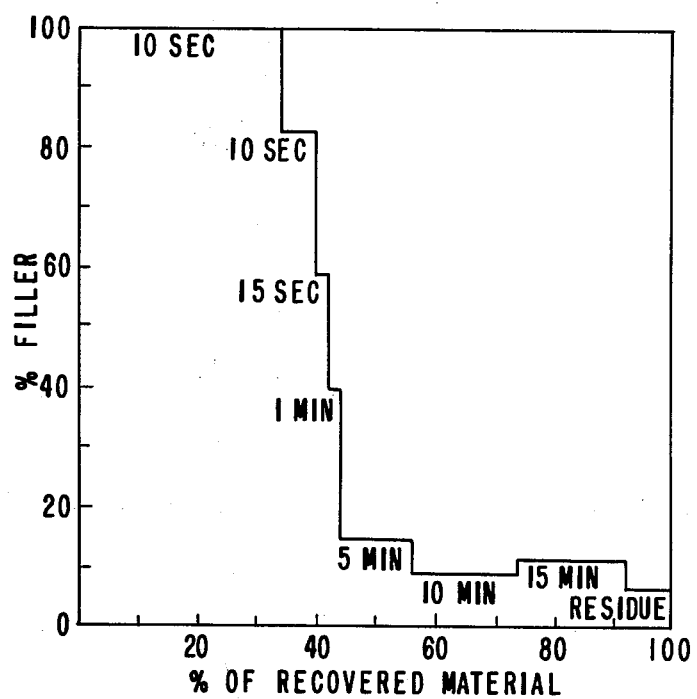

HOMOGENEOUS, HIGHLY-FILLED, POLYOLEFIN COMPOSITES

CROSS-REFERENCE TO RELATED APPLICATIONS

This is a continuation-in-part of my copending application Ser. No. 573,598, filed Apr. 30, 1975 now abandoned, which is in turn a continuation-in-part of applications Ser. Nos. 424,820; 424,821; and 424,822, all filed on Dec. 14, 1973 and now abandoned; 444,295, filed Feb. 21, 1974 and now abandoned; and 529,006, filed Dec. 2, 1974, and now abandoned.

BACKGROUND OF THE INVENTION

1. Field of the Invention

This invention relates to filled polymers, and more particularly to highly-filled polyolefin composites, and processes for making these composites, and formed objects therefrom.

2. Description of the Prior Art

The utility of organic polymers has been broadened in recent years to the degree that rigid polymers such as the nylons, ABS (acrylonitrile/butadiene/styrene) and polyacetal resins have begun to replace the more conventional metal, wood and ceramic materials. The lower cost of polyolefins such as polyethylene could make them candidates for a wider range of applications if certain properties such as heat deflection temperature, stiffness and hardness could be improved.

Much research has been directed toward methods of improving these properties, mostly by filling polyolefins with finely-divided solids or fibrous fillers. The addition of fillers to polyolefins also serves to extend the use of polyolefins.

One method of preparing a filled polyolefin is by melt blending the polyolefin and filler. This procedure, however, requires that the polyolefin have a relatively low molecular weight, for example, an inherent viscosity of about 1 or less. While the stiffness of the resulting products is generally increased, these products typically suffer from the disadvantages of having a low elongation, e.g., less than about 15%, and being brittle, e.g., having a 0° F. Izod impact strength below about 0.75 ft lb/in of notch. Moreover, problems are encountered during compounding of these products, including large power requirements for mixing machinery, degradation of the polymer by heat, nonuniformity of the filler dispersion, and poor adhesion of polymer to filler, even when "coupling compounds" are employed. These problems become more serious as the molecular weight of the polyolefin increases.

In order to avoid the problems encountered with these melt blended products, varius attempts have been made to prepare filled polyolefins without compounding the polyolefin and the filler, the most widely used such method being polymerization of the olefin in the presence of selected fillers. Most of the suggested methods involve the use of coordination catalysts. These well-known catalysts are combinations of a compound of a transition metal of Group IVa, Va or VIa of the Periodic Table and a reducing compound, for example, an alkylaluminum compound or, more broadly, an organometallic compound of a metal of Group Ia, IIa, or IIIb of the Periodic Table. The Periodic Table referred to throughout this specification is that published in Advanced Inorganic Chemistry by Cotton and Wilkinson, third edition (1972), Interscience Publishers.

These methods of forming polyolefin in the presence of filler have lead to heterogeneous products and, in general, have not provided the desired toughness for highly-filled polyolefin compositions. Although 0° F. Izod impact strengths as high as about 1 ft lb/in of notch and elongations at break as high as about 50% may be obtained at 30% filler in some cases, these values drop off significantly at higher filler contents. For example, at about 50% filler the 0° F. Izod impact strength of these same compositions would be of the order of only about 0.1 ft lb/in of notch and the elongation at break would be of the order of only about 1%.

SUMMARY OF THE INVENTION

The present invention provides a solid, homogeneous, particulate, highly-filled polyolefin composite which can be molded to formed articles of superior toughness, stiffness and hardness without any further compounding with bulk polyolefin. The composite comprises (a) about 10 to about 75% by weight of polyolefin having an inherent viscosity of at least about 2 selected from the group consisting of polyethylene and copolymers of ethylene containing up to about 15% by weight of units derived from one or more 1-alkenes of 3 to 10 carbons, and (b) about 25 to about 90% by weight of finely-divided, inorganic filler compound having a neutral-to-acidic surface and a weight-average equivalent spherical particle diameter of about 0.1 to less than about 50μ, and having interacted at its surface sufficient catalytically-active transition metal compound to provide about 0.000001 to about 1.7 milligram-atom of transition metal per gram of filler, said polyolefin being polymerized onto the surface of said filler, and said composite having a 10-second micronization homogeneity of at least about 50% and a micronization homogeneity index of at least about 20.

A preferred composite which is compression moldable further comprises (a) about 10 to about 70% by weight of polyolefin having an inherent viscosity of at least about 4, and (b) about 30 to about 90% by weight of inorganic filler compound.

Another preferred composite which is injection moldable further comprises (a) about 30 to about 75% by weight of polyolefin having an inherent viscosity of 2–6, and (b) about 25 to about 70% by weight of inorganic filler compound having about 0.000001 to about 0.1 milligram-atom of transition metal, per gram of filler, interacted at its surface.

The composites of this invention are made by various processes. One method which involves the use of titania-containing aluminum silicate clays comprises (A) dehydrating finely-divided aluminum silicate clay selected from the group consisting of kaolinite, attapulgite, and fuller's earth, and containing at least about 0.05% by weight of titania, said clay having a weight-average equivalent spherical particle diameter of less than about 50μ, and being free of promotion with added transition metal coordination catalyst component, by heating at a temperature of about 400° to about 1400° C. to reduce the water content to less than one mole of water per mole of aluminum silicate;

(B) dispersing
  (1) at least about 1 weight/volume percent of finely-divided inorganic filler compound, said filler being
    (a) about 70 to about 100% by weight of said dehydrated aluminum silicate clay, and
    (b) 0 to about 30% by weight of pigmentary oxide selected from the group consisting of titania, zinc oxide, antimony trioxide and mixtures thereof, said pigmentary oxide having a weight-average equivalent spherical particle diameter less than that of the clay, and
  (2) about 0.001 to about 1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each, in an inert, liquid hydrocarbon diluent;
(C) contacting the resulting dispersion with olefin selected from the group consisting of ethylene and mixtures of ethylene with one or more 1-alkenes of 3 to 10 carbons with agitation at a temperature of about 0 to about 250° C. and a pressure from about atmospheric to about 500 atmospheres until a composite containing about 10 to about 70% by weight, based on the polyolefin and filler, of polyolefin selected from the group consisting of polyethylene and copolymers of ethylene containing up to about 15% by weight of units derived from one or more 1-alkenes of 3 to 10 carbons having an inherent viscosity of at least about 4 is formed; and
(D) isolating the resulting polyolefin/filler composite as a free-flowing powder.

Another method of preparing the composites of this invention involving the pretreatment of the filler with a hydrolyzable titanium compound comprises (A) contacting a finely-divided, inorganic filler compound having a neutral-to-acidic surface and a weight-average equivalent spherical particle diameter of less than about 50μ with sufficient hydrolyzable titanium compound to provide about 0.000001 to about 1.7 milligram-atom, per gram of filler, of titanium interacted at the surface of the filler;
(B) removing unadsorbed titanium compound from the filler;
(C) hydrolyzing the adsorbed titanium compound;
(D) activating the titanium-treated filler by heating at a temperature of at least about 100° C. to form a titania-modified filler;
(E) dispersing
  (1) at least about 1 weight/volume percent of finely-divided, inorganic filler compound, said filler being
    (a) about 70 to about 100% by weight of said titania-modified filler, and
    (b) 0 to about 30% by weight of pigmentary oxide which is not titania-modified, said pigmentary oxide being selected from the group consisting of titania, zinc oxide, antimony trioxide and mixtures thereof and having a weight-average equivalent spherical particle diameter less than that of said titania-modified filler; and
  (2) about 0.001 to about 1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each, in an inert, liquid hydrocarbon diluent;
(F) contacting the resulting dispersion with olefin selected from the group consisting of ethylene and mixtures of ethylene with one or more 1-alkenes of 3 to 10 carbons with agitation at a temperature of about 0 to about 250° C. and a pressure from about atmospheric to about 500 atmospheres until a composite containing about 10 to about 70% by weight, based on the polyolefin and filler, of polyolefin selected from the group consisting of polyethylene and copolymers of ethylene containing up to about 15% by weight of units derived from one or more 1-alkenes of 3 to 10 carbons having an inherent viscosity of at least about 4 is formed; and
(G) isolating the resulting polyolefin/filler composite as a free-flowing powder.

Another method of preparing the composites of this invention involving the use of a hydrocarbon-soluble, organic, transition metal compound in which the organoaluminum compound is prereacted with the filler comprises (A) dispersing
  (1) at least about 1 weight/volume percent of finely-divided, inorganic filler compound having a neutral-to-acidic surface and a weight-average equivalent spherical particle diameter of less than about 50μ, and
  (2) about 0.001 to about 1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1–10 carbons each, in an inert, liquid hydrocarbon diluent;
(B) adding to the resulting dispersion catalytically-active, hydrocarbon-soluble, organic, transition metal compound which is at least 50 times more active when adsorbed onto the surface of the filler than in solution in an amount equivalent to about 0.00001 to about 0.1 milligram-atom of transition metal per gram of filler,
(C) contacting the resulting dispersion with olefin selected from the group consisting of ethylene and mixtures of ethylene with one or more 1-alkenes of 3 to 10 carbons with agitation at a temperature of about 0° to about 100° C. and a pressure from about atmospheric to about 500 atmospheres until a composite containing about 10 to about 70% by weight, based on the polyolefin and filler, of polyolefin selected from the group consisting of polyethylene and copolymers of ethylene containing up to about 15% by weight of units derived from one or more 1-alkenes of 3 to 10 carbons having an inherent viscosity of at least about 2 is formed; and
(D) isolating the resulting polyolefin/filler composite as a free-flowing powder.

Another method of preparing the composites of this invention involving the use of a hydrocarbon-soluble, organic, transition metal compound in which the organoaluminum compound is prereacted with the transition metal compound comprises (A) reacting organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each with sufficient catalytically-active, hydrocarbon-soluble, organic, transition metal compound to provide a mole ratio of organoaluminum compound to transition metal compound of about 1000:1 to about 4:1 thereby forming a complex, (B) dispersing
  (1) at least about 1 weight/volume percent of finely-divided, inorganic filler compound having a neutral-to-acidic surface and a weight-average equivalent spherical particle diameter of about 0.1 to less than about 50μ, and
  (2) the organoaluminum compound-transition metal compound complex in an amount equivalent to about 0.001 to about 1.0 millimole, per gram of filler, of organoaluminum compound and about 0.00001 to about 0.1 milligram-atom, per gram of filler, of transition metal in an inert, liquid hydrocarbon diluent;

(C) contacting the resulting dispersion with olefin selected from the group consisting of ethylene and mixutres of ethylene with one or more 1-alkenes of 3 to 10 carbons with agitation at a temperature of about 0° to about 100° C. and a pressure from atmospheric to about 500 atmospheres until a composite containing about 10 to about 75% by weight, based on the polyolefin and filler, of polyolefin selected from the group consisting of polyethylene and copolymers of ethylene containing up to about 15% by weight of units derived from one or more 1-alkenes of 3 to 10 carbons having an inherent viscosity of at least about 2 is formed; and (D) isolating the resulting polyolefin/filler composite as a free-flowing powder.

BRIEF DESCRIPTION OF THE DRAWINGS

FIG. 3 shows a micronization graph for a composition made by powder blending equal parts by weight of polyethylene and kaolinite clay in accordance with the prior art.

DESCRIPTION OF THE PREFERRED EMBODIMENTS

Figure 1:
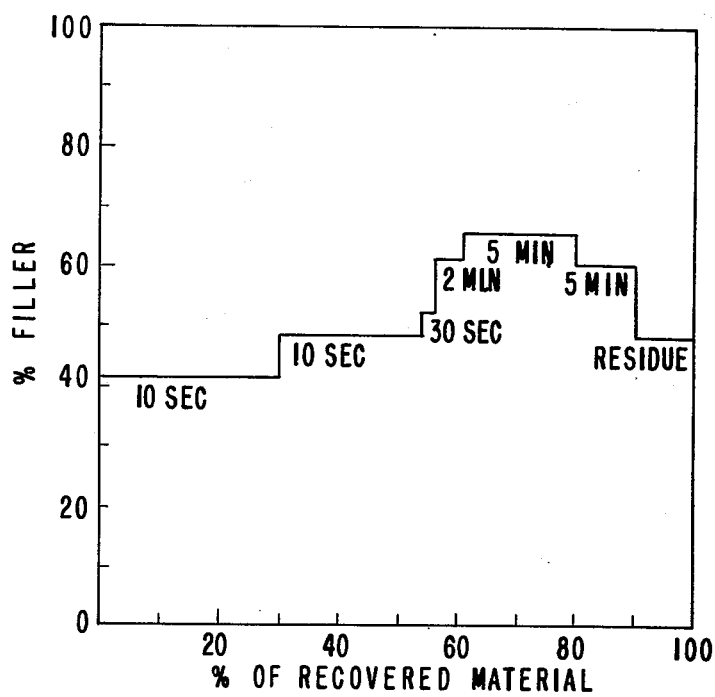
FIG. 1 shows a micronization graph for the 49/51 weight percent polyethylene/kaolinite clay composite of Example 1.
Figure 2:
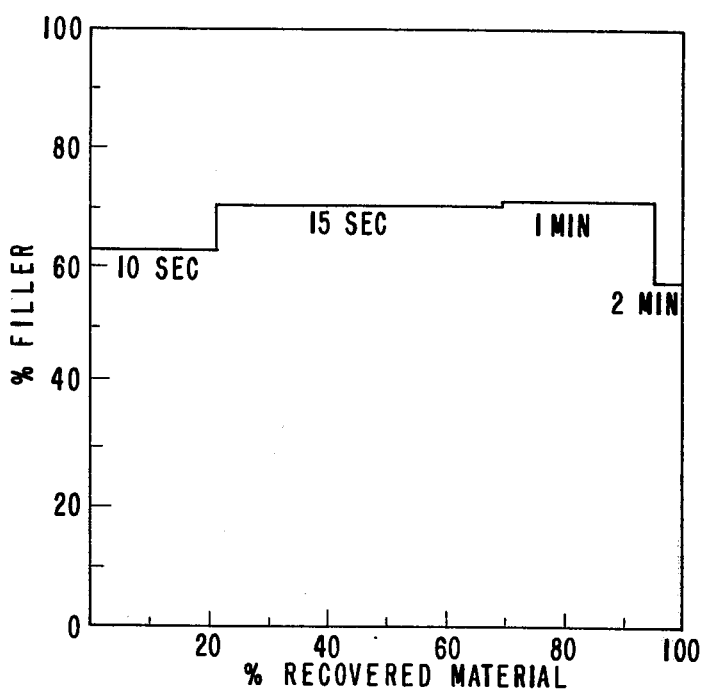
FIG. 2 shows a micronization graph for the 32/68 weight percent polyethylene/alumina trihydrate composite of Example 2.

The filled polyolefin composites of this invention provide formed objects which are not brittle at high filler contents, but retain the good elongation, impact strength, and electrical properties, e.g., volume resistivity, which are characteristic of unfilled polyolefins. For example, many of the composites of this invention, even at 50% filler content, have 0° F. Izod impact strengths of the order of about 10 ft lb/in of notch or more and elongations at break of the order of about 200% or more. Surprisingly, in many cases, 0° F. Izod impact strengths of the order of about 1 ft lb/in of notch and elongations at break of the order of about 25% are obtained with filler contents as high as about 90% in accordance with this invention.

With regard to the filled polyolefins of the prior art prepared by melt blending, the composites of this invention are less expensive to prepare. Moreover, the composites of this invention have a superior combination of properties when compared with the corresponding heterogeneous filled polyolefin compositions prepared by polymerizing the olefin in the presence of filler by prior art techniques.

The preferred composites of this invention exhibit a range of properties including improved modulus, greater hardness, lower creep, higher heat deflection temperature and lower material cost which, when compared with unfilled polyolefins, indicate a value-in-use not previously realized. When the polyolefin/filler composite additionally contains an inorganic pigmentary oxide as described below, the combination of physical properties is in the range of the expensive ABS copolymer resins and thereby provides an economically superior product for uses requiring toughness, rigidity and high impact strength.

One of the important features which distinguishes the filled polyolefin composites of this invention from many of the filled polyolefin compositions of the prior art is that they are highly filled, that is, they contain at least about 30%, and up to about 90%, by weight, of filler. This invention provides a reduction in the cost of polyolefin compositions by the addition of large amounts of filler without sacrificing essential physical properties.

Another characteristic which distinguishes the highly-filled polyolefin composites of this invention from many of the filled polyolefin compositions of the prior art and leads to the unusual combination of physical properties of the composites of this invention is that the polyolefin is polymerized onto the surface of the finely-divided, inorganic filler compound. In other words, each polymer chain is initiated at, and grows from, the surface of the filler. The term "surface" includes all crevices, cracks, pores, voids, and other interstices contributing to the total surface of the filler.

Still another characteristic which distinguishes the highly-filled polyolefin composites of this invention from many of the filled polyolefin compositions of the prior art is the high molecular weight of the polyolefin. The polyolefin must have an inherent viscosity of at least about 2 in order for the composites of this invention to exhibit the unusual combination of physical properties which characterize them. All of the composites of this invention are compression moldable. For optimum properties of the composite, the polyolefin should have an inherent viscosity of at least about 4, preferably at least about 8, and more preferably at least about 12. For injection molding, the polyolefin should have an inherent viscosity of about 2 to about 6, and preferably about 3 to about 5. The term "inherent viscosity", as used herein, refers to inherent viscosities determined by the standard procedure outlined below.

A characteristic which distinguishes the highly-filled polyolefin composites of this invention from all of the filled polyolefin compositions of the prior art is that they are homogeneous, that is, substantially free of polymer-free filler and filler-free polymer. The degree of homogeneity of the composite is determined by measuring its micronization homogeneity. The micronization homogeneity determination is carried out by micronization and centrifugation of the particulate composite using an air micronizer. This measurement indicates the degree to which all of the particles have the same polyolefin/filler content. Compositions which contain a significant amount of polyolefin-free filler or filler-free polyolefin do not possess this characteristic homogeneity.

The composites of this invention have a 10-second micronization homogeneity of at least about 50%, and preferably at least about 70%, and a micronization homogeneity index of at least about 20, and preferably at least about 50. The terms "10-second micronization homogeneity" and "micronization homogeneity index", as used herein, refer to values determined by the standard procedures outlined below. These procedures are used to obtain micronization graphs of the type illustrated in the drawings. The micronization homogeneity values are calculated from the data used to plot these graphs.

The homogeneous composites of this invention are prepared by a variety of specific processes whereby the olefin is polymerized onto filler having the transition metal component of the coordination catalyst interacted at its surface in the presence of an organoaluminum compound. The term "interacted" means bonded directly, or indirectly through the organoaluminum compound, so that it cannot be washed off. The term "at its surface" refers to the monomolecular layer of the filler which contains active polymerization sites.

There are two important concepts which must be adhered to in preparing the composites of this invention. The first concept is that substantially all of the polymerization must occur on the surface of the filler rather than in solution. This can be accomplished in either of two ways. The preferred method is to use a transition metal compound which, in combination with an organoaluminum compound, is essentially inactive as an olefin polymerization catalyst in solution, but which, when adsorbed onto the surface of the filler, is active as a polymerization catalyst.

When the transition metal compound is active in solution, the procedure has to be modified so that all transition metal present during polymerization is irreversibly adsorbed onto the surface of the filler. Thus, for example, in the case of titanium tetrachloride, excess titanium tetrachloride not adsorbed by the filler must be removed and the adsorbed titanium compound hydrolyzed to titanium oxide. When the transition metal compound has low or moderate activity in solution, but is much more active when adsorbed onto the filler, for example, 50 to 100 times more active, then it can be used to form homogeneous composites without going through this modification.

The second important concept which must be adhered to in these processes is that polymerization must take place on substantially all of the filler particles. If the catalyst is very active and is readily adsorbed by the filler, for example, as in the case of tetrabenzylzirconium, care must be taken that the relatively small amount of catalyst required is not all adsorbed by only part of the filler. This situation is overcome by first reacting the filler with excess organoaluminum compound which reduces the rate at which the transition metal compound is adsorbed by the filler, and then adding the transition metal compound. Another way of overcoming this situation is to prereact an excess of the organoaluminum compound with the transition metal compound to form a complex which is less readily adsorbed by the filler, and then react this complex with the filler. With some transition metal compounds, for example chromium octoate, it is possible to react the transition metal compound directly with the filler without any deleterious effect.

The composites of this invention contain about 10 to about 75% by weight of polyolefin, and preferably about 20 to about 70%. The compression moldable composites contain about 10 to about 70%, preferably about 15 to about 60% and most preferably about 20 to about 55%. The injection moldable composites contain about 30 to about 75%, and preferably about 50 to about 70%. At least about 10% by weight of polyolefin is necessary to provide sufficient binder to form tough objects. The minimum amount of polyolefin necessary in any specific case will depend on the density, nature and particle size of the filler. With larger particle sizes and higher particle densities less polyolefin is needed.

The polyolefins which are useful in accordance with this invention are polyethylene and copolymers of ethylene containing up to about 15% by weight of units derived from one or more 1-alkenes of 3 to 10 carbons. Suitable comonomers include propylene, 1-butene, 1-pentene, 3-methyl-1-butene, 4-methyl-1-pentene, 1-hexene, 1-octene, 1-decene, and mixtures thereof. Particularly preferred is polyethylene. Other monomers known to be reactive in coordination polymerization reactions, for example, linear, nonconjugated diolefins such as 1,4-hexadiene, 1,6-octadiene, dicyclopentadiene, norbornene and norbornene derivatives such as ethylidenenorbornene, may also be added in small amounts.

The composites of this invention also contain about 25 to about 90% by weight of finely-divided, inorganic filler compound. The compression moldable composites contain about 30 to about 90% by weight of inorganic filler compound, preferably about 40 to about 85%, and most preferably about 45 to about 80%. The injection moldable composites contain about 25 to about 70% by weight of inorganic filler compound, and preferably about 30 to about 50%.

As the filler content of the composite is increased, as indicated by the minimum in the preferred and most preferred ranges, the stiffness, hardness, and useful temperature range increase without degrading other desirable properties of the composite. Filler contents are determined by ash analysis, that is, from the ash content on combustion. Since combustion removes all water of hydration, the filler content is calculated from the ash content by accounting for this loss of water during combustion.

Any inorganic filler compound can be used in accordance with this invention provided it meets the criteria described below. By "inorganic filler compound" is meant a solid compound which does not contain carbon except in the form of carbonate. Suitable fillers include minerals, for example, alumina hydrates such as alumina trihydrate and the like; metal phosphates and sulfates such as insoluble calcium phosphates, calcium sulfate, and barium sulfate; silicas ($SiO_2$) such as sand, diatomaceous earth and pumice; metal carbonates such as barium carbonate, calcium carbonate and zinc carbonate; metal oxides such as titania (e.g., rutile and anatase), zinc oxide, antimony trioxide, and iron oxide (e.g., magnetite $FeO.Fe_2O_3$); basic aluminum sodium carbonates such as dawsonite; and water-insoluble silicates such as aluminum silicate clays; and natural mixtures of these compounds such as slate. Other suitable inorganic fillers include synthetic silicas; synthetic carbonates; glass powder and fibers; synthetic silicates such as "Silene" L, a precipitated, hydrated calcium silicate; and synthetic titanates such as "Fybex", an acicular potassium titanate.

By "alumina hydrates" is meant compositions of the formula $Al_2O_3 \cdot xH_2O$ in which x is about 1.5–3.0. By "alumina trihydrates" is meant compositions of the formula $Al_2O_3 \cdot xH_2O$ in which x is about 2.5–3.0.

By "water-insoluble silicates" is meant silicates which are either completely insoluble or so close to being completely insoluble that the small amount of solubility does not prevent the advantages of this invention from being realized. Typical water-insoluble silicates include calcium silicates ($CaSiO_3$) such as wollastonite; magnesium silicates such as talc; magnesium calcium aluminum silicates $[(Mg,Ca)O \cdot Al_2O_3 \cdot 5SiO_2 \cdot nH_2O]$ such as montmorillonite and serpentine; lithium aluminum silicates such as spodumene $[(Li,Na)_2Al_2Si_4O_{12}]$; potassium aluminum silicates such as feldspar ($K_2O \cdot Al_2O_3 \cdot 6SiO_2$) and mica ($K_2O \cdot 3Al_2O_3 \cdot 6SiO_2 \cdot 2H_2O$); magnesium iron silicates such as olivine $[(Mg,Fe)_2SiO_4]$; aluminum silicates ($Al_2O_3 \cdot SiO_2$) such as sillimanite and kyanite; and aluminum silicate clays.

A particularly preferred class of fillers is aluminum silicate clays of the formula $Al_2O_3 \cdot xSiO_2 \cdot nH_2O$ where x is 1 to 5 and n is 0 to 4. Suitable aluminum silicate clays include kaolinite, attapulgite, fuller's earth and bentonite. The preferred clays are kaolinites including: Georgia Kaolin Company's "Hydrite" MP, 1.68% $TiO_2$ (calcined), average particle size $9.5\mu$, range $1.5–35\mu$; Engelhard Minerals Company's "ASP" 400, 1.75% $TiO_2$ (calcined), average particle size $4.8\mu$, range $0.7–20\mu$; Engelhard's "ASP" 100, 1.75% $TiO_2$ (calcined), average particle size $0.55\mu$, range $0.4–4\mu$; Engelhard's "Satintone"-1, 2.0% $TiO_2$ (calcined); Harwick Standard Chemical Company's "Harwick" GK, 2.05% $TiO_2$ (calcined), 53% particle size less than $2\mu$; and "Harwick" 50-R 1.85% $TiO_2$ (calcined), average particle size $0.55\mu$. These clays generally have average effective particle diameters of about 0.1 to $44\mu$.

Another preferred group of fillers is alumina hydrates such as alumina trihydrates, and basic aluminum sodium carbonates such as dawsonite. Formed objects exhibiting flame-retardant characteristics are obtained when at least about 30% by weight of the filler in the composite is one or more of these fillers, and especially when the composite is composed at least about 50% by weight of one or more of these fillers. Dawsonite is the preferred flame retardant filler because it has a higher decomposition temperature and produces less smoke.

The filler used in accordance with this invention should have a neutral-to-acidic surface. Many fillers such as alumina hydrates, silicas, water-insoluble silicates, insoluble calcium phosphates, titania, zinc oxide, iron oxide, antimony trioxide and mixtures thereof naturally have neutral-to-acidic surfaces. Other fillers such as calcium sulfate, calcium carbonate, barium sulfate, zinc carbonate and dawsonite are basic in nature and thereby inhibit polymerization. Still other minerals such as mica, silicas which contain alkali metal or alkaline earth metal, and wollastonite give variable polymerization behavior.

In those cases where the filler is not neutral-to-acidic, it has been found that polymerization inhibition difficulties can be overcome by first coating the filler with about 0.01 to about 2%, based on the filler, of an acidic oxide such as silica, alumina or acid phosphate thereby giving the filler an acidic surface. More could be added but would serve no useful purpose. The amount of acidic oxide at the surface of the filler can vary from about 0.001 to about 0.5 millimole per gram of filler, and preferably about 0.01–0.05 millimole.

These acidic oxide coatings are obtained by treating the filler with a compound which is hydrolyzed to an acidic oxide. For example, carbonate fillers are coated by simply mixing an aqueous suspension containing about 10–50% by weight of the solid filler with an aqueous solution containing about 1–10% by weight of an aluminum salt. Other minerals can be coated by treating with an aqueous salt solution and ammonia. Acid phosphate coatings can be obtained by treating the filler with phosphoric acid. Silica coatings can be obtained, for example, by treating calcium carbonate with silicon tetrachloride.

Although it is not intended that this invention be limited to any particular theory or mechanism of reaction, a possible rational explanation of the chemistry involved in forming these coatings is represented by the following equations:

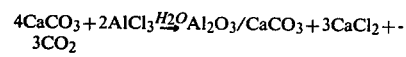

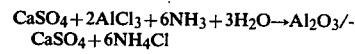

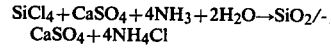

The fillers used in accordance with this invention should have a weight-average equivalent spherical particle diameter of less than about $50\mu$, and especially about 0.1 to less than about $50\mu$. The term "equivalent spherical particle diameter" is used because not all of the useful fillers are composed of spherical particles, and thus the particles do not have diameters as such. This term means that a given particle has a diameter equivalent to the diameter of a sphere having the same volume. Preferably the weight-average equivalent spherical particle diameter is less than about $45\mu$, and most preferably is about 1 to about $25\mu$. If the average particle size is smaller than about $0.1\mu$, then the advantageous impact strength and elongation obtained in accordance with this invention may not be realized. If the average particle diameter is larger than about $50\mu$, then the impact resistance will be less than desired especially at higher filler contents. Also composites containing such large filler particles result in formed objects having rough surfaces in areas which undergo stretching during formation.

The fillers used in accordance with this invention preferably also should have a surface area of less than about 100 $m^2/g$, especially about 0.01 to less than about 100 $m^2/g$. Most preferably the surface area is in the range of about 0.5–50 $m^2/g$. If the surface area is too small, then the product may not have the requisite homogeneity. If the surface area is too great, the advantageous combination of impact strength, elongation and stiffness obtained in accordance with this invention may not be realized.

The composites of this invention are prepared using an inorganic filler having interacted at its surface a catalytically active transition metal compound. By "transition metal" is meant a metal of Group IVa, Va or VIa of the Periodic Table. These metals are titanium, zirconium, hafnium, vanadium, niobium, tantalum, chromium, molybdenum and tungsten.

The transition metal components of coordination catalyst systems disclosed in the prior art as being suitable for olefin polymerization are generally suitable for use in accordance with this invention. Preferably the transition metal compound, at the stage that it comes in contact with the olefin in the polymerization process, contains substantially no halogen bonded to the transition metal. The filler should contain sufficient transition metal compound to provide about 0.000001 to about 1.7 milligram-atom, per gram of filler, of transition metal, and preferably about 0.00001 to about 0.8 milligram-atom interacted at the surface of the filler.

The upper limit of about 1.7 milligram-atoms, per gram of filler, of transition metal interacted at the surface of the filler represents saturation of the monomolecular layer at the surface of the filler with transition metal in the closest possible packing configuration. Although more transition metal can be adsorbed as an added layer, no more than about 1.7 milligram-atoms of transition metal can interact at the surface.

The processes used to prepare the composites of this invention also include as part of the coordination catalyst system an organoaluminum compound selected from the group consisting of trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, have 1 to about 10 carbons each. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as aluminum-isoprene polymers are described in U.S. Pat. No. 3,149,136. The trialkylaluminums and dialkylaluminum hydrides are preferred. The alkylaluminum halides are not preferred since the final polymer is corrosive to metal in many applications. Preferably the composites of this invention are free of residual halogen and thus noncorrosive. The organoaluminum compound should be present in the amount of about 0.001 to about 1.0 millimole, per gram of filler, and preferably about 0.002 to about 0.2 millimole.

One approach to preparing these products involves techniques for pretreating the filler to contain about 0.00001 to about 1.7, and preferably about 0.001 to about 0.8 milligram-atom per gram of filler, of certain transition metals in the form of a catalytically-active transition metal compound interacted at its surface, unless it already has such a metal component interacted at its surface in its natural occurring state, and isolating the transition metal compound-containing filler from any transition metal compound not attached to the filler. The polymerization is then carried out by dispersing the pretreated filler in an inert, liquid hydrocarbon along with the organoaluminum compound and the olefin.

When the filler is an aluminum silicate clay naturally containing at least about 0.05% and preferably at least about 0.5% by weight of titania and being selected from the group consisting of kaolinite, attapulgite and fuller's earth, it contains a sufficient amount of titania in active form at its surface that polymerization is promoted in the presence of about 0.01 to about 2% by weight of an alkylaluminum compound, based on the filler, without addition of catalytically-active transition metal compound being necessary. A typical calcined aluminum silicate clay of this type contains, for example, about 0.5 to about 2.5% titania, and most commonly about 1.68 to about 2.05% titania.

When using these titania-containing clays without added transition metal, homogeneous composites are prepared by first dehydrating the clay to reduce its water content to less than one mole of water per mole of aluminum silicate ($Al_2O_3.xSiO_2$) in accordance with the equation:

$$Al_2O_3.xSiO_2.nH_2O \rightarrow Al_2O_3.xSiO_2.yH_2O + (n-y)H_2O$$

where x is 1 to 5, n is 0 to 4, and y is less than 1. In the foregoing equation the terms "$nH_2O$" and "$yH_2O$" represent a simple and convenient way of denoting water content of the clay before and after treatment. The actual way in which the water is combined in the clay is not known for certain, but it is probably more complex than a simple hydration. The dehydration is carried out by heating, that is, calcining, the clay in a dry atmosphere at a temperature of about 400° to about 1400° C. for up to about 18 hours.

It is preferred in most cases that the atmosphere used during this dehydration be an oxidizing atmosphere. By "oxidizing atmosphere" is meant an atmosphere containing at least about 0.5% oxygen. It is believed that the presence of a nominal amount of oxygen in the atmosphere during the dehydration prevents loss of chemically combined oxygen by the clay. In the case of certain clays such as those having a low iron content, the dehydration can be carried out in a nonoxidizing atmosphere. The polymerization is then carried out by dispersing the dehydrated clay in a hydrocarbon diluent and adding the organoaluminum compound and the olefin.

When the filler does not naturally contain the desired amount of titania in active form, for example bentonite and alumina trihydrate and some samples of kaolinite, attapulgite and fuller's earth, it can be pretreated to contain active titanium sites. In accordance with this process, the filler is first contacted with a hydrolyzable titanium compound, the absorbed titanium species is hydrolyzed, and the titanium-treated filler is activated. It has been found that any neutral-to-acidic filler can be pretreated by this process.

Suitable hydrolyzable titanium compounds include titanium tetrachloride, tetraalkyl titanates and mixtures thereof wherein the alkyl groups, alike or different, have 1-6 carbon atoms. In the case of titanium tetrachloride, the filler can be exposed to titanium tetrachloride vapor until the surface is saturated. In the case of the titanate esters, the filler is milled with a solution of titanate ester. Since the titanium compound is adsorbed from the solution by the filler, the concentration of titanium in the solution may vary over wide limits provided the solution at least contains the minimum amount of titanium that is desired at the surface of the filler. Suitable tetraalkyl titanates include tetramethyl titanate, tetraethyl titanate, tetrapropyl titanate, tetraisopropyl titanate, and the like. Contacting of the filler with titanium tetrachloride or a titanate ester is believed to result in bonding a titanium-containing group to the surface of the substrate filler. The titanium-containing filler is then freed of unadsorbed titanium compound by washing or by vaporization such as by sweeping with hot nitrogen.

The adsorbed titanium compound is then hydrolyzed to what is believed to be a derivative of titanic acid [Ti(OH)$_4$] chemically bound to the surface of the particle. When the titanium compound is titanium tetrachloride, this can be accomplished by contacting the titanium-treated filler with aqueous or moist gaseous ammonia to ensure that all of the chlorine is removed. In the case of a titanate ester, hydrolysis of the titanium compound can be accomplished by exposing the titanium-treated filler to moist air.

The titanium-treated filler is then activated by heating at a temperature of at least about 100° C. Although the form of the titanium compound on the surface of the activated filler is not known with certainty, it is believed to be closely related to titania. Accordingly, the hydrolyzed and activated titanium-treated filler is referred to herein as titania-modified filler. In the case of alumina trihydrate the activation temperature should not exceed about 200° C. and preferably is about 100° to about 180° C. In the case of titania-modified clay, further activation can be obtained, if desired, by dehydrating the clay to reduce the water of hydration to less than that of the monohydrate. This dehydration is carried out at a temperature of about 400° to about 1400° C. for up to about 18 hours.

In the case of titania-modified clay, the effects of this activation and/or dehydration step can advantageously be maximized by preceding, accompanying or following it with a hydrogenation step. This is accomplished by heating the clay at a temperature of about 100° to about 1400° C. for about 0.5–20 hours under hydrogen flow. The change effected in the clay is retained on storage in air or on air-oxidation of the clay at elevated temperatures. The actual state of oxidation or reduction of the clay is of no consequence when this hydrogenation is carried out. After activation, the polymerization is carried out by contacting the pretreated filler with an organoaluminum compound and olefin.

Any of the neutral-to-acidic fillers described herein can be pretreated to provide a chromium compound interacted at the surface. The chromium treating step is carried out by treating the filler with a solution of a chromium(III) compound in a suitable solvent. The solvent used to prepare this solution may be water or any organic liquid in which the chromium(III) compound is soluble. A preferred class of solvents includes polar solvents such as water and alcohols, especially alkanols such as methanol. Suitable water-soluble or organic solvent-soluble chromium compounds include chromium nitrate; chromium halides such as chromium chloride, bromide and iodide; $C_1$ to $C_{12}$ organic cid salts of chromium such as chromium acetate, chromium oxalate, chromium octoate, and chromium naphthenate; chromium sulfate; fumaratochromium(III) nitrate; methacrylatochromium hydroxide; methacrylatochromium chloride; and the like; and mixtures thereof. The chromium compound is preferably halogen-free.

The chromium-modified filler is activated by drying at a temperature of about 25° to about 400° C., preferably about 150° to about 250° C., and most preferably about 175° to about 200° C. At temperatures below the boiling point of the solvent being removed, the drying process may be assisted by use of vacuum. Although it is not understood exactly what takes place during this activation step, it is believed that more than a simple drying is involved. The terms "dry" and "drying", when used throughout the specification and claims in reference to the filler, mean dry to the extent that residual volatiles no longer adversely effect polymerization. After activation, the polymerization is carried out by contacting the pretreated filler with an organoaluminum compound and olefin.

In carrying out the polymerization reaction, part of the pretreated filler may be replaced by one or more of certain inorganic pigmentary oxides not having catalytically-active transition metal compound interacted at their surface. These pigments, which can comprise up to about 30% by weight of the particulate filler, include pigmentary titania, zinc oxide, antimony trioxide and mixtures thereof. Although pigmentary titania will catalyze some olefin polymerization, it is not considered to be catalytically active in the sense of the catalytically-active transition metal compounds used herein.

When inorganic pigmentary oxide is present, the filler preferably contains about 5 to about 25% by weight of pigmentary oxide. The pigmentary oxide may be activated, if desired, by heating at a temperature of at least about 100° C. The pigmentary oxide should have a weight-average equivalent spherical particle diameter less than that of the filler having catalytically-active transition metal compound interacted at its surface. Preferably the pigmentary oxide has a weight-average equivalent spherical particle diameter of not more than half that of the filler having catalytically-active transition metal compound interacted at its surface. A substrate containing pigmentary oxide of the specified particle size, in addition to the transition metal-containing filler, yields whiter products and generally permits even higher filler loading than otherwise possible without any loss in the properties of the products.

When the inorganic filler is a mixture of two or more of the above solid components, the mixture is generally milled, e.g., in a paint mill, ball mill, colloid mill, sand grinder or rod mill, until all components are uniformly dispersed. This process usually requires about 0.1 to about 24 hours. The milling can be performed on the dry components, but is preferably done in a slurry of the filler in an inert diluent such as the one to be used in the polymerization step.

Before the filler can be used in the polymerization reaction, it must first be freed of gaseous oxygen, water and other polar impurities that interfere with the polymerization reaction. This is readily accomplished by sweeping the filler with an inert gas such as nitrogen with heating.

The polymerization is carried out by dispersing at least about 1 weight/volume percent, and preferably about 5 weight/volume percent of the pretreated filler in an inert, liquid hydrocarbon, along with the organoaluminum compound. The olefin is then added and the polymerization is carried out until a composite containing about 10 to about 70% by weight, based on the polyolefin and filler, of polyolefin is formed. The term "weight/volume percent", as used throughout the specification and claims, refers to grams of solid added to 100 milliliters of liquid.

Another and a preferred approach to preparing the homogeneous composites of this invention involves the adsorption at the surface of the filler in the polymerization medium of a hydrocarbon-soluble, organic, transition metal compound which is relatively more active as a catalyst when adsorbed at the surface of the filler, for example at least about 50 times more active, than when in solution. Accordingly, this approach does not require removal of excess transition metal compound from the polymerization reaction medium. This approach is especially suitable for preparing the injection moldable composites described herein. By "hydrocarbon-soluble" is meant an organic transition metal compound which is soluble in at least one hydrocarbon solvent or can be solubilized in such solvent by the presence of an organoaluminum compound.

In accordance with this method, the polymerization is carried out by dispersing the filler, for example, an alumina hydrate, silica or water-insoluble silicate, in an inert, liquid hydrocarbon along with a hydrocarbon-soluble, organic, transition metal compound, and an organoaluminum compound. It has been found that this method can be used with any filler having a neutral-to-acidic surface.

The hydrocarbon-soluble, organic, transition metal compounds used in this approach are of the formula $$L_nMX_p$$

wherein L is an organic ligand bonded to M by carbon, oxygen, or nitrogen; M is a transition metal; X is a non-organic ligand, preferably halogen; n is an integer from 1 to the highest valence of M; and p is an integer from 0 to 1 less than the highest valence of M. Suitable L groups include hydrocarbyl such as alkyl and alkenyl, substituted hydrocarbyl such as substituted alkyl and substituted alkenyl, hydrocarbyloxy, hydrocarboncarbonyloxy, hydrocarbylsilylhydrocarbyl, dihydrocarbylamino, β-diketonato, and the like.

Illustrative classes of suitable hydrocarbon-soluble, organic, transition metal compounds include tetrabenzylzirconium and related tetrabenzyl, tetrakis(substituted benzyl), and tetrakis(naphthylmethyl) derivatives of titanium, zirconium, and hafnium disclosed by Long in U.S. Pat. No. 3,635,935, Pioli et al. in U.S. Pat. No. 3,681,317, and Candlin et al. in U.S. Pat. No. 3,738,944; tetrakis(trimethylsilylmethyl)zirconium and related compounds disclosed by Candlin et al. in U.S. Pat. No. 3,738,944; and tetraneophylchromium and the related tetrahydrocarbylchromiums disclosed by Kruse in U.S. Pat. No. 3,798,250.

A preferred class of hydrocarbon-soluble, organic, transition metal compounds are those in which some or all of the L groups are substituted alkyl groups of the formula

—CH$_2$Y in which Y represents an atom or group capable of interaction with the vacant d-orbitals of the metal M. Suitable Y groups include aromatic groups such as phenyl, naphthyl, substituted phenyl and substituted naphthyl groups, and groups of the formula

M'(R)$_3$ in which M' is carbon or silicon, and R, alike or different, is hydrocarbyl such as alkyl or aryl.

Specific hydrocarbon-soluble, organic, transition metal compounds include tetrabenzylzirconium, tetrabenzyltitanium, tetrabenzylhafnium, tetraneophylzirconium, tetraneophylchromium, tetraneophyltitanium, tetrakis(p-isopropylbenzyl)-titanium, tetratolyltitanium, tetrakis(tetraethylbenzyl)-titanium, tetramethyltitanium, tetraneopentylzirconium, tetraneopentyltitanium, tetraneopentylhafnium, tetrakis(p-methylbenzyl)zirconium, tetrakis(1-naphthylmethyl)titanium, tetrakis(trimethylsilylmethyl)zirconium, tribenzylzirconium chloride, tris(π-allyl)zirconium bromide, tris(π-methallyl)-titanium chloride, tetrakis(π-allyl)hafnium, tetrakis(π-allyl)chromium, tetrakis(π-allyl)niobium, chromium octoate, chromium naphthenate, tetrakis(2,4-pentanedionato)zirconium, tetrakis(2,4-pentanedionato)titanium, tetrakis(dimethylamino)titanium, tetrakis(diethylamino)vanadium, and the like. Preferably the organic transition metal compound contains no halogen bonded to metal.

The amount of hydrocarbon-soluble, organic, transition metal compound added to the polymerization reaction should be equivalent to about 0.00001 to about 0.1 milligram-atom of transition metal per gram of filler and preferably about 0.0001 to about 0.01 milligram-atom. This amount will provide filler having interacted at its surface sufficient organic transition metal compound to provide about 0.000001 to about 0.1 milligram-atom of transition metal per gram of filler and preferably about 0.00001 to about 0.01 milligram-atom.

The preferred hydrocarbon-soluble, organic, transition metal compounds are the zirconium compounds. Preferably the polymerization reaction is carried out in the presence of an amount of zirconium compound equivalent to about 0.0005 to about 0.005 milligram-atom of zirconium per gram of filler. This amount will provide filler having interacted at its surface sufficient organic transition metal compound to provide about 0.0001 to about 0.001 milligram-atom of zirconium per gram of filler.

The most active of the hydrocarbon-soluble, organic, transition metal compounds are the ziconium compounds. In order to provide homogeneous composites using hydrocarbon-soluble, organic, zirconium compounds, it has been found that the initial contact for the filler and the transition metal compound should not be between each other. This same rule is advantageously followed in the case of the less active transition metal compounds, with the possible exception of chromium compounds of low activity whre satisfactory results are obtained by contacting the filler and the transition metal compound directly. Initial contact between the filler and the transition metal compound leads in most cases to a heterogeneous product and should be avoided.

In preparing homogeneous products by this approach, initial contact between the filler and the transition metal compound can be avoided by proceeding in one of two ways. In accordance with one method, the filler is first reacted with a large excess of the organoaluminum compound. The transition metal compound is then added. The mole ratio of organoaluminum compound to transition metal compound should preferably be in the range of about 1000:1 to about 4:1, and most preferably about 40:1 to about 10:1.

Although it is not intended that this invention be restricted to any particular theory, it is believed that this excess organoaluminum compound reacts with many of the hydroxyl groups on the surface of the filler, thus limiting the reactive sites available to the transition metal compound. The transition metal compound now reacts uniformly with all of the filler particles as it seeks the limited number of available sites.

In accordance with another and preferred method of avoiding initial contact between the filler and the transition metal compound, the transition metal compound is first reacted with a large excess of the organoaluminum compound in amounts which provide a mole ratio of organoaluminum compound to transition metal compound of about 1000:1 to about 4:1 thereby forming a complex. The dispersion of filler in the hydrocarbon diluent is then contacted with the complex in an amount equivalent to about 0.001 to about 1.0 millimole, and preferably about 0.002 to about 0.2 millimole, per gram of filler, of organoaluminum compound, and about 0.00001 to about 0.1 milligram-atom, and preferably about 0.0001 to about 0.01 milligram-atom, per gram of filler, of transition metal.

Suitable inert, liquid hydrocarbon diluents for use as the polymerization medium include aromatic, saturated aliphatic, and saturated alicyclic hydrocarbons. While the liquid cyclic and acyclic hydrocarbons of about 5–10 carbons such as pentane, hexane, heptane, octane, decane, cyclohexane, benzene, toluene, xylene and tetralin are preferred, the lower boiling propanes and butanes can also be used.

The diluent should be anhydrous and preferably is made so by passing it through highly absorptive alumina such as a Woelm acid alumina column immediately prior to use. The liquid diluents can also be freed of contaminants such as oxygen and water by treatment with traces, e.g., about 0.50%, based on the weight of diluent, of the organoaluminum compound to be used as a catalyst component in the polymerization. This, along with the acid alumina treatment, ensures maximum avoidance of moisture and other impurities.

The slurry of the filler in the diluent can be quite viscous, especially in the case of high-solids slurries. Addition of the organoaluminum compound to these slurries with vigorous stirring dramatically reduces the viscosity. For example, the viscosity of a typical system might be reduced from about 5,000 centipoises to about 300 centipoises.

The polymerization reaction can be carried out at temperatures of about 0° to about 250° C. Polymerization temperatures below that at which the diluent swells the polyolefin are preferred since swelling greatly increases the viscosity of the reaction mixture and makes agitation difficult or impossible unless low concentrations of materials are used. For practical reasons, polymerizations should be run at temperatures not in excess of about 100° C. when pure alkanes or cycloalkanes are used. When a strong polyolefin solvent such as benzene, toluene, tetralin or xylene is used, even lower temperatures such as about 60° C. or below should be used. Preferably temperatures of about 25° to about 100° C. are used, and most preferably about 50° to about 90° C.

Polymerization is readily carried out at pressures from about atmospheric to about 500 atmospheres. Pressures in the lower range are generally preferred, and about 3–70 atmospheres are most satisfactory. The course of the polymerization reaction is followed by noting the change in weight of the supply vessel containing the olefin. The supply vessel is normally used to maintain the pressure in the reaction vessel. Reaction times may vary over a wide range, for example, from a few seconds to about 24 hours.

When composites in which the molecular weight of the polyolefin is to be restricted, for example inherent viscosities below about 12, are prepared, the polymerization generally is carried out in the presence of hydrogen. In this case the hydrogen:olefin partial pressure ratio is about 1:20 to about 20:1, and preferably about 1:5 to about 5:1. Preferably the total pressure is not in excess of about 500 psi.

When combinations of particulate fillers are used, intimate mixing is critical to provide finely-divided, uniform composites. Agitation during polymerization controls both particle size and uniformity of composition. Strong agitation, as achieved with very rapid stirring, gives a fine-grained, free-flowing product. This is best achieved by use of an autoclave equipped with an efficient stirrer. The resulting polyolefin/filler composite is isolated as a free-flowing, homogeneous powder by means of conventional steps such as filtering, washing and drying.

The filled polyolefin composites of this invention are essentially static-free. By "static-free" is meant powder compositions which flow freely through a glass funnel having an inside stem diameter of 1 centimeter.

The particle size of the filled polyolefin composite can vary over the range of about $0.1\mu$ to about 5 mm depending on the particle diameter of the filler and the amount of aggregation in the product. Aggregates are readily broken up. Preferably the particle diameter is in the range of about 1 to about $500\mu$.

In these composites it is believed that the polyolefin coats and penetrates the filler. However, the polyolefin does not completely encapsulate the filler particles as evidenced by the extraction of alumina from polyolefin/clay composites by treatment with mineral acid. It is further believed that the deposited polyolefin is intimately bonded to the filler. The composites of this invention, consequently, run no danger of mechanical separation into their components during agitation or mechanical operations. This is the basis for using air micronization to determine the homogeneity of these composites.

Two or more composites of this invention having different properties can be readily blended together to give a new composite having properties intermediate to those of the individual component composites. For example, a flame-retardant composite based on alumina trihydrate can be blended with a composite having a high modulus and a high heat deflection temperature based on kaolinite clay to give a new composite having properties intermediate between those of the component composites. Such blends can be prepared by blending techniques involving temperatures below the softening point of the composite. For example, the composites can be blended by dry-blending techniques or by high-speed stirring of the component composites in a suitable liquid medium. When a liquid medium is used, it has been found that the use of a small amount of a conventional wetting agent is helpful.

A wide variety of additives can be readily blended with the polyolefin/filler composites without the necessity of melting the polymer. For example, the composites can be stabilized against ultraviolet and thermal oxidative exposure by the addition of conventional stabilizers and conventional antioxidants. Suitable ultraviolet light adsorbers include substituted benzophenones such as 2-hydroxy-4-n-heptyloxybenzophenone, benzotriazoles such as substituted hydroxybenzotriazoles, salicylates such as phenyl salicylate, metal chelates such as "Cyasorb" UV 1084 and "Cyasorb" UV 2548, and carbon black.

Suitable antioxidants for addition to the composites of this invention include alkylated phenols and bisphenols such as "Good-rite" 3114, a butylated hydroxytoluene; alkylidene bis-, tris-, and polyphenols such as "Irganox" 1010 and "Santowhite" powder; thio and dithio bis-, tris-, and polyalkylated phenols such as "Santonox";

phenol condensation products such as "Toponol" CA; amines such as "Carstab" 601; esters such as dilauryl thiodipropionate; and organic phosphites and phosphates such as tridodecyl phosphite and tris(nonylphenyl) phosphites. Fire retardants such as chlorinated polyethylene, zinc phosphates and tris(2,3-dibromopropyl) phosphate can also be added.

The composites of this invention can also be formulated with conventional organic and inorganic pigments to provide colored systems. Suitable pigments include quinacridone red, anthraquinone red, diarylide yellow-HR, bis-azo red, bis-azo orange, bis-azo yellow, isoindolinone orange, isoindolinone yellow, isoindolinone red, phthalocyanine blue, pthalocyanine green, carbon black, iron oxide, ultramarine blue, ultramarine green, pigmentary oxides such as pigmentary titania, zinc oxide and antimony trioxide, and the like. Preferably these pigments should have a weight-average effective spherical particle diameter less than that of the filler containing the active polymerization sites.

The composites of this invention are formed into useful articles by various forming techniques, some of which have been used heretofore with polyolefins and other resins and others which have been used heretofore for metal forming but which have not been previously used for resins. These techniques generally involve subjecting the composite to a temperature at which the composite softens in the range of about 105° to about 250° C. and a positive pressure of about 10 to about 100,000 psi or more. The temperature selected in any specific case will depend on the particular filler used. For example, composites containing alumina trihydrate are preferably not processed above about 200° C. In general, temperatures of about 150° to about 225° C. and pressures of about 10 to about 15,000 psi are preferred.

A useful means of forming articles from these polyolefin/filler composites is by compression molding, which involves the simultaneous application of heat and pressure. This operation can be carried out by filling a mold with the composite powder, and pressing the powder in the mold with application of heat sufficient to raise the temperature above the softening point of the composite. Temperatures of about 150° to about 225° C. and positive pressures of about 10 to about 5000 psi, and preferably of at least about 1000 psi, are suitable. When the formed article has cooled below the melting point of the polymer, the mold is opened and the article is removed.

Sheets may be formed from these polyolefin/filler composites using suitable sheeting equipment by passing the composite along a continuous belt, subjecting the composite to a softening temperature in the range of about 150° to about 250° C. while it passes through a restricted space which compresses the composite against the belt at a pressure of about 50 to about 5000 psi without subjecting the composite to shearing forces, and removing the resulting sheet from the continuous belt after it passes through the restricted space.

One suitable piece of equipment for forming these sheets is a continuous vulcanizer. Using this equipment the polyolefin/filler powder is placed on a continuous belt which passes through shear-free compression rolls. The powder is heated to a softening temperature in the range of about 150° to about 225° C. while it is compressed through the compression rolls at a pressure of about 50 to about 100 psi. The composite can be heated in any suitable manner such as by passing the belt containing the composite through a heating zone prior to passing through the compression rolls or by use of a heated compression roll.

Sheets can also be formed using sheeting equipment of the type described in U.S. Pat. No. 3,286,008. By this method the composite is heated to a softening temperature of about 150° to about 250° C. as it is compressed between two continuous belts which, as they progress, move closer together thereby developing a pressure of about 1000 to about 5000 psi. The resulting sheet is then cooled to a temperature below the melting point of the polyolefin and removed from between the belts.

Useful articles can be prepared from these sheets by suitable reforming techniques. For example, formed objects of a wide variety of shapes can be prepared by heating a piece of compression molded sheet and then pressing the hot sheet between a male die and a pad of elastomeric material. The temperature to which the sheet is heated can vary from about 105° to about 225° C. The male die can be made of any solid material such as metal, wood, resin, and the like. Suitable elastomeric materials include silicone rubber, urethane rubber, and the like. The elastomeric pad can be of any suitable thickness, for example, it can be a block of elastomeric material having rigid backing. The hot sheet is allowed to cool as it is pressed between the die and the pad, and thus can be removed from the die almost immediately. In some cases it is desirable to subject the die to internal cooling.

The reforming of these compression molded sheets can also be carried out by controlled hydraulic forming in which the elastomeric pad is a rubber diaphragm backed by a hydraulic fluid. Still another method of reforming is by hot or cold, matched-metal mold forming, that is, pressing or stamping the sheet between male and female metal dies at temperatures from ambient to about 250° C.

The composites of this invention can also be formed into films. These films may be obtained by stretching a sheet or film formed by any of the above compression molding techniques, such as the above sheeting techniques or pressing between platens and heating. The stretching can be carried out at temperatures from room temperature to temperatures above the melting point of the polyolefin. The sheet or film may be stretched either in one direction or in more than one direction either sequentially or simultaneously. The degree of voids developed during stretching will vary depending on the stretching technique, filler, and size of filler particle used.

In the case of pull stretching, an opaque, paper-like film having an increased degree of voids is obtained. This technique reduces the thickness of the film, but does not necessarily change its strength. Stretching by rolling the sheet or film under pressure results in a film which is stronger than the original and has a relatively lower void content than a similar film formed by pull-stretching. In this rolling technique, temperatures above or below the normal melting temperature of the polyolefin may be used.

Because of the particulate nature of the composites of this invention they are amenable to another method of forming objects, based on powder technology, which involves cold compressing in a mold followed by sintering. The powder is placed in a mold and compressed at a pressure of about 100 to about 100,000 psi, preferably at least about 1000 psi, and most preferably, at least about 5,000 psi, at a temperature below the melting point of the polymer to form self-supporting articles. The article is then removed from the mold and densified by heating at a temperature above the softening point of the composite, e.g., about 105° to about 225° C., to form the finished article.

The composites of this invention are also useful for coating a wide variety of substrates by conventional powder-coating techniques. In accordance with these techniques, for example, a substrate can be heated and then dipped into a fluidized bed of the composite powder. The powder will adhere to the hot substrate because of the adhesive character of the softened composite. The powder coating is then coalesced by sintering. This technique is useful for wire coating and the like.

When the polyolefin has an inherent viscosity of about 2 to about 6, the composites of this invention can also be formed into useful articles by conventional injection molding techniques. These techniques generally involve ram or screw injection of the composite into a mold and subjection of the composite in the mold to a temperature at which it softens in the range of about 150° to about 250° C. and a positive pressure of at least about 1,000 psi. In general, temperatures of about 210° to about 240° C. and pressures of about 10,000 to about 15,000 psi are preferred. The temperature selected in any specific case, however, will depend on the particular filler used. For example, composites containing alumina trihydrate should not be processed above about 200° C. Preferably these composites are processed at temperatures of about 170° to about 195° C. Preferably the polyolefin has an inherent viscosity of about 3 to about 5.

Determination of Inherent Viscosity

Inherent viscosity is measured by the following procedure except where otherwise noted: A sample of the composite powder calculated to contain 0.025 g of polyolefin is placed in a closed flask containing a magnetic stirring bar and adapted for insertion of a thermometer and a condenser containing a nitrogen purge tube. Into this flask is pipetted 50 ml of 1,2,4-trichlorobenzene containing 1.33 g/l of butylated hydroxytoluene antioxidant to give a 0.05 weight/volume percent solution of polyolefin.

With the thermometer and condenser in place, nitrogen is slowly passed over the contents of the flask, the magnetic stirrer is started, and the contents of the flask are heated to 180° C. The solution is stirred at this temperature for 2 hours. At the completion of this time, the condenser unit and the thermometer are removed from the flask. A ground glass stopper is inserted into the thermometer-well, a tube to support a capillary viscometer is inserted in the condenser-well, and the entire unit is transferred to an oil bath and maintained at 130° C. A capillary viscometer having three scratch marks, one near the bottom, one above the bulb and one below the bulb is inserted in the support tube.

After 1 hour at 130° C. in the oil bath, the viscometer is adjusted so that the tip is immersed in the solution to the depth indicated by the bottom scratch. Vacuum is gently applied to the top of the viscometer until the solution has risen to a level above the top scratch on the viscometer. The vacuum is removed and the solution is allowed to fall. The flow of the solution between the scratch above the bulb and the scratch below the bulb is timed. This flow time measurement is repeated until three values which check within ±0.3 second are obtained. The flow time of the pure solvent is also measured at 130° C. in the same way.

The inherent viscosity is calculated using the following equations:

$$\text{Relative Viscosity} = \frac{\text{Time of solution flow}}{\text{Time of solvent flow}}$$

$$\text{Inherent Viscosity} = \frac{\text{natural log of relative viscosity}}{\text{w/v\% polymer concentration}}$$

Determination of 10-Second Micronization Homogeneity

The 10-second micronization homogeneities of the composites of this invention are determined using an 8-inch, stainless steel Jet Pulverizer Model 08-505 micronizer made by the Jet Pulverizer Co., Palmyra, N.J. This micronizer contains a grinding chamber, pneumatic feeder and a product discharge tube. The grinding is performed by 6 air jets placed tangent to a 5-inch circle at the peripheral wall of the grinding chamber. The pneumatic feeder consists of a funnel feeding into a venturi tube connected at one end to an air jet and discharging at the other end into the top of the grinding chamber tangent to the peripheral wall. The product discharge tube is a central chamber into which the product drops and through which it is discharged.

The procedure for determining 10-second micronization homogeneity is as follows: The air jets of the micronizer are turned on and the air pressure is adjusted to 75 psi. A 10-gram sample of the polyolefin/filler composite powder isolated from the polymerization is added all at once directly to the raw-feed funnel. Ten seconds after the sample is added, the air jets are turned off and the 10-second micronization product fraction is recovered from the discharge tube. The percent filler content of this product is determined by measuring its ash content by combustion. The filler content of this fraction is then compared with the filler content of the feed composite to get an absolute difference in filler content. The 10-second micronization homogeneity (MH) percentage is determined in accordance with the equation:

$$MH = 100 - \frac{\text{absolute difference in filler content} \times 100}{\text{filler content of feed}}$$

In any case in which the amount of product fraction obtained from the discharge tube of the micronizer is less than 0.5 g, the air micronizer is restarted for an additional 10 seconds and an additional product fraction is taken from the discharge tube without adding any more sample. This is repeated, if necessary, until a total of at least 0.5 g of product is obtained. The percent filler content is then determined on this combined fraction.

Determination of Micronization Homogeneity Index

The micronization homogeneity index is determined by restarting the air micronizer and taking additional product fractions from the discharge tube of the micronizer without adding any more sample. The micronizer is operated at 75 psi air pressure for periods found suitable to give at least three more reasonably sized fractions, with the residue, if any, considered to be the last fraction. The last fraction must contain 5–15% by weight of the recovered product with the proviso that the percentage of the total recovered product in the last fraction must not exceed the percentage of polyolefin in the feed composite.

The filler content of each of the fractions, including the first 10-second fraction, is determined. The micronization homogeneity index (MHI) is then calculated by subtracting the difference (Δ) between the filler content of the highest filler fraction and the filler content of the lowest filler fraction from the 10-second micronization homogeneity (MH) percentage in accordance with the following equation;

MHI = MH − Δ

The results of these homogeneity tests correlate very well with the physical properties of the composites, especially with the elongation at break and 0° F. Izod impact strength. When the filler content of the composition is below about 67% the 10-second micronization homogeneity alone serves to differentiate between homogeneous and heterogeneous compositions. For example, a typical partially heterogeneous 50% clay composition of the prior art prepared by polymerizing olefin in the presence of titanium trichloride and clay had a 10-second micronization homogeneity of about 42%. In an extreme case of heterogeneity, a typical prior art 50/50 blend of clay and polyethylene, having the homogeneity graph illustrated in FIG. 3, has a 10-second micronization homogeneity of about 2%.

When the filler content of the composition is above about 67%, the 10-second test becomes less reliable by itself as an indicator of homogeneity. For example, a prior art type 11/89 blend of polyethylene and clay, which gives a micronization graph similar to that of FIG. 3, was found to have a 10-second micronization homogeneity of 88%. However, the micronization homogeneity index was -3.

Examples of the Invention

The following examples illustrate the invention. All parts and percentages are by weight unless otherwise specified. In these examples, except as otherwise noted, triisobutylaluminum is added as a 1.6 M solution in heptane and triethylaluminum is added as a 1.0 M solution in heptane.

In these examples physical properties are determined by the following ASTM test designations.

| Property | Test Specifications |
| --- | --- |
| Tensile strength, maximum (T) | ASTM D-638-71A |
| Elongation at break ($E_b$) | ASTM-D-638-71A |
| Modulus in tension, initial ($M_i$) | ASTM-D-638-71A |
| Izod impact strength | ASTM D-256-72A |
| Gardner impact strength (falling dart) | SPI TS-159 |
| Heat deflection temperature (HDT) | ASTM D-648-56 |
| Flexural strength | ASTM D-790-71 |
| Flexural modulus | ASTM D-790-71 |
| Rockwell hardness | ASTM D-785-65 |
| Oxygen index | ASTM D-2863 |

In the tensile, elongation and modulus tests, test bars of Type I and Type V of ASTM test method 638-72 and bars prepared according to ASTM test method 638-44T were used.

Oxygen index (OI) is a measure of the fractional part by volume of oxygen in an oxygen-nitrogen mixture necessary to support combustion of the sample. Accordingly, any value in excess of 0.21 indicates flame retardance in air.

EXAMPLE 1

This example use "Harwich" GK (Harwick Standard Chemical Co.) soft kaolinite clay which has a surface area of 9.3 m²/g, in which 53% of the particles have a weight-average equivalent spherical particle diameter of less than 2μ. A 40-g portion of the above clay which had been dried at 250° C. for 18 hrs in a 30-liter/hr stream of nitrogen was added to 600 ml of dry, deoxygenated cyclohexane in a blender cup to which had already been added 4 mmol (0.8 g) of triisobutylaluminum and 0.2 mmol of tetrabenzylzirconium dissolved in 2 ml of toluene. The clay contained approximately 0.005 milligram-atom of zirconium per gram of clay.

The polymerization was carried out at 50° C. under 100 psi ethylene pressure for 25 minutes and produced 78 g of powder that passed a 28-mesh screen.

The product was found to contain 51.02% clay by ash analysis. The 10-second micronization homogeneity was 80% and the micronization homogeneity index was 56. Test bars compression molded at 175° C. and 2000 psi had the following physical properties:

| | |
| --- | --- |
| Tensile (T): | 2577 psi |
| Elongation ($E_b$): | 263% |
| Modulus ($M_i$): | 323,000 psi |
| 0° F. Izod impact: | 17.4 ft lb/in of notch |

EXAMPLE 2

This example uses "GHA" 332 (Great Lakes Foundry Sand Co.) $Al_2O_3.3H_2O$ which has a weight-average equivalent spherical particle diameter of 4μ. The alumina trihydrate was dried at 180°–190° C. for 12.5 hr under a 700-liter/hr flow of nitrogen.

The reaction mixture was prepared in a dry Binks tank fitted with a stirrer under nitrogen pressure. The following ingredients were added to the tank in the specified order.

2.5 gal of dry, deoxygenated hexane
30.0 mmol of triisobutylaluminum
1.2 mmol of tetrabenzylzirconium in 12 ml of toluene The mixture was stirred for 0.5 hr and then 1900 g of the alumina hydrate was added. Stirring was continued for an additional 0.5 hr and the entire contents of the tank were pumped under nitrogen blanket into a 5-gal, stirred autoclave. The tank was rinsed with an additional gallon of hexane and the rinse liquid was also added to the autoclave. The polymerization was carried out at 50° C. under 100 psi ethylene pressure for 29.5 min.

The product was found to contain 68.3% $Al_2O_3.3H_2O$ by ash analysis. The polymer had an inherent viscosity of 29.94. The 10-second micronization homogeneity was 93% and the micronization homogeneity index was 79. Test bars compression molded at 175° C. and 3000 psi had the following physical properties:

0° F. Izod impact: 6.9 ft lb/in of notch
74° F. Gardner impact: 140 in lb (125 mil sample)
−40° F. Gardner impact: 160 in lb (125 mil sample)

EXAMPLE 3

This example illustrates the preparation of a composite from a kaolinite clay without the addition of a transition metal coordination catalyst component using triisobutylaluminum as the organoaluminum compound.

A batch of "Harwick" GK kaolinite clay (Example 1) was dried (calcined) at 600° C. under a flow of dry 4:1 nitrogen:oxygen mixture at 30 liters/hour for 13 hours and cooled under nitrogen to ambient temperature. The calcined clay had a surface area of 7.4 m²/g. The total titanium content of the calcined clay was 0.24 milligram-atom per gram.

A 500-ml batch of deoxygenated cyclohexane was passed through a bed of Woelm acid alumina and transferred under a nitrogen blanket to a closed blender. The solvent was stirred and 0.5 mmole (0.1 g) of triisobutylaluminum and 40 g of the above clay was added in turn followed by 0.15 g of additional triisobutylaluminum.

The resulting clay suspension was transferred to a 1-liter, stainless steel autoclave fitted with a magnetically driven stirrer. Ethylene was added and the mixture stirred and heated at 70° C. and an ethylene pressure of 100 psi for 1 hour and 27 minutes. The autoclave was cooled, unreacted ethylene vented, and the reaction mixture filtered to recover 76.5 g of polyethylene/clay composite.

Ash analysis showed that the product contained 48.3% clay. The polyethylene had an inherent viscosity of 12.88. The composite had a 10-second micronization homogeneity of 78% and a micronization homogeneity index of 53. A strip of film, hot-pressed from this product, was oriented by drawing 5.5 diameters at 150° C.

Test bars were prepared by heating the composite at 175° C. for 3 minutes, followed by compression at 2000 psi for 1 minute. These bars had the following properties:

| | | |
|---|---|---|
| Tensile (T): | 3134, | 3028 psi |
| Elongation ($E_b$): | 471, | 422% |
| Modulus ($M_i$): | 463,100, | 409,500 psi |
| 0° F. Izod impact: | 4.9 ft lb/in of notch | |
| 264-psi Heat deflection: | 56° C. | |

EXAMPLE 4

This example illustrates the preparation of a composite from a kaolinite clay without the addition of a transition metal coordination catalyst component using diisobutylaluminum chloride as the organoaluminum compound.

A batch of "Harwick" GK kaolinite clay (Example 3) was dried (calcined) at 600° C. under a 30 liters/hour flow of 4:1 $N_2:O_2$ mixture for 18 hours and cooled under nitrogen. A 1-liter autoclave was charged with a mobile suspension of 60 g of the above clay in 600 ml of cyclohexane and 0.8 g of diisobutylaluminum chloride. Polymerization was carried out at 70° C. and an ethylene pressure of 100 psi for 2 hours and 46 minutes.

The product, a powder, amounted to 106 g. Ash analysis showed that the composite had a clay content of 57.1%. The 10-second micronization homogeneity was 79%. The polyethylene had an inherent viscosity of 30.67. A film pressed from the powder at 180° C. was strong and flexible.

Compression molded test bars had the following properties:

| | | |
|---|---|---|
| Tensile (T): | 2772, | 2784 psi |
| Elongation ($E_b$): | 272, | 372% |
| Modulus ($M_i$): | 442,000, | 445,000 psi |
| 0° F. Izod impact: | 1.4, | 1.4 ft lb/in of notch |

EXAMPLE 5

This example illustrates the formation of sheets from a polyolefin/filler composite and the reforming of these sheets into formed objects.

(A) "Harwick" GK kaolinite clay (Example 3) was dried at 600° C. for 18 hours under a 100 l/hr flow of a 4:1 $N_2:O_2$ mixture and cooled under nitrogen flow. A batch of 2.5 gallons of deoxygenated, dry cyclohexane containing 5 g of triisobutylaluminum was placed in a dry, oxygen-free, 5-gallon, glass-lined kettle under nitrogen purge. After stirring this solution for 10 minutes, a low-viscosity suspension of 1500 g of the above clay in 1 gallon of dry, oxygen-free cyclohexane containing 10 g of triisobutylaluminum was added to the glass-lined kettle. The polymerization was carried out at 70° C. for 12 hours under an ethylene pressure of 100 psi. The product was stabilized by adding 20 g of "Irganox" 1010 antioxidant dissolved in 300 ml of ether to the slurry, collected by filtration and dried in air.

The product weighed 3142 g after sieving through a 16-mesh screen and had a clay content of 43.41% by ash analysis. Test bars were prepared by preheating the composite in a mold at 175° C. for 3 minutes, followed by compression at 2000 psi for 1 minute. These bars had the following properties:

| | | |
|---|---|---|
| Tensile (T): | 2886, | 2795 psi |
| Elongation ($E_b$): | 336, | 408% |
| Modulus ($M_i$): | 248,000, | 295,000 psi |
| 0° F. Izod impact: | 21 ft lb/in of notch (gave a hinge break) | |

(B) Part (A) was repeated. The product weighed 2778 g and had a clay content of 48.05% by ash analysis. The 10-second micronization homogeneity of this product was 84% and the micronization homogeneity index was 52. Test bars were prepared by preheating the composite in a mold at 175° C. for 3 minutes, followed by compression at 2000 psi for 1 minute. These bars had the following properties:

| | | |
|---|---|---|
| Tensile (T): | 3206, | 2276 psi |
| Elongation ($E_b$): | 461, | 230% |
| Modulus ($M_i$): | 370,000, | 311,000 psi |
| 0° F. Izod impact: | 18 ft lb/in of notch (hinge break) | |

(C) The products of Parts (A) and (B) were placed in a large container and the container was rolled to mix the powders before using. The mixture was put through a 24-in wide continuous vulcanizer made by Adamson United Company (subsidiary of United Engineering and Foundry Co.). The vulcanizer has rolls, one of which is heated, joined by a continuous stainless steel belt.

In this procedure, the composite powder was fed onto the stainless steel belt, squeezed between the rolls without shear, and carried around the heated roll at 400° F. and a speed of 1.8 ft/min. The sheet was manually removed from the roll. The physical properties of the composite sheet, measured in two directions, were as shown in Table I. Test bars were prepared by preheating the composite in a mold at 175° C. for 3 minutes, followed by compression at 2000 psi for 1 minute. These bars had the properties given in Table I.

TABLE I

| | T (psi) | $M_i$ (kpsi) | $E_b$ (%) | 0° F. Izod (ft lb/-in of notch)[a] |
|---|---|---|---|---|
| Machine Direction | 2940 | 310 | 157 | 13 |
| Transverse Direction | 2570 | 354 | 205 | 13 |
| Compression Molded | 2790 | 305 | 357 | 19 |
| | 2740 | 340 | 345 | 18 |

[a] no clean break, values approximate (D) The composite sheet prepared above was heated on a hot plate and its temperature was monitored with a surface pyrometer. When it reached the desired temperature, it was transferred to a male die in the shape of a truncated pyramid and pressed between the die and a block of silicone rubber. The rubber assumed the shape of the mass that was pressed into it and thus acted as a female die. After the sheet cooled, the mold was opened and the formed pyramid was removed. An Izod impact test at room temperature was performed on pieces cut from the side of the formed piece. The data obtained are given in Table II.

TABLE II

| Forming Temperature, 0°C. | 0° F. Izod impact, ft lb/in of notch |
|---|---|
| 130 | 15.4 |
| 145 | 11.4 |
| 160 | 12.5 |
| Unformed sheet | 17.2 |

EXAMPLE 6

A 400 g sample of "Hydrite" MP kaolinite clay (Georgia Kaolin Co., weight-average equivalent spherical particle diameter of 9μ, range of 1.5-35μ) was placed in a beaker between two layers of glass wool. The assembly was heated at 300° C. for 20 hours while purging with nitrogen. The clay was cooled to 160° C., the nitrogen flow stopped and a 10-ml portion of titanium tetrachloride placed in the bottom of the beaker by means of a long hypodermic needle and syringe. The titanium tetrachloride treatment was repeated after 2 hours. After vaporization of the titanium tetrachloride ceased, the clay was exposed to ambient air to permit complete hydrolysis. The original clay after calcining contained 0.97% natural titanium and the titania-modified clay contained 1.3% total titanium, which is equivalent to 0.27 milligram-atom of Ti per gram.

The above modified clay was dried by heating at 400° C. under a 30 liters/hour flow of a 4:1 nitrogen:oxygen mixture for 18 hours. The dried partially dehydrated clay was cooled under nitrogen.

A 50-g portion of the above clay was added under nitrogen purge to a dry, 1-liter autoclave equipped with a magnetic stirrer with 500 ml of cyclohexane containing 0.59 g (3 mmoles) of triisobutylaluminum. The autoclave was closed and connected to a source of ethylene. Ethylene was added, and agitation and heating were begun. Polymerization was effected at 70° C. and an ethylene pressure of 100 psi for 3 hours and 25 minutes. The polyethylene/clay composite was collected by normal filtering, washing and drying procedures.

The dried product amounted to 80 g which gave an ash analysis of 58.8% by weight. The polymer had an inherent viscosity of 18.53. The composite had a 10-second micronization homogeneity of 68% and a micronization homogeneity index of 44. Compression molded bars had the following physical properties:

| | |
|---|---|
| Tensile (T): | 3075 psi |
| Elongation ($E_b$): | 206% |
| Modulus ($M_i$): | 410,000 psi |
| 0° F. Izod impact: | 8.7 ft lb/in of notch |

EXAMPLE 7

This example illustrates the preparation of composites from kaolinite clay and pigmentary oxide using titanium tetrachloride as the source of the transition metal.

A 500-g portion of "Harwick" GK kaolinite clay (Example 1), was layered between glass wool in a 3-liter beaker, and dried at 300° C. while purging with nitrogen. After 18 hours, the clay was cooled to 160° C. and 10-ml, 10-ml and 5-ml portions of titanium tetrachloride were vaporized through the clay at 3-hour intervals. The clay was cooled under nitrogen purge and exposed to air for 4 days to convert chlorides of titanium to oxides of titanium.

A uniform mixture of 160 g of the above modified clay and 40 g of "Ti-Pure" R-101 rutile (titanium dioxide pigment, E. I. du Pont de Nemours and Company, weight-average equivalent spherical particle diameter of 0.18μ) in 200 ml of cyclohexane was milled with glass rods for 1 day. The filler mixture was collected by filtration, dried at 600° C. under a 4:1 nitrogen:oxygen mixture flow of 30 liters/hour for 18 hours and cooled under nitrogen from 400° C.

Deoxygenated cyclohexane (500 ml) was passed through a bed of Woelm acid alumina into an enclosed blender cup under constant nitrogen purge. The solvent was stirred with 0.1 g (0.5 mmol) of triisobutylaluminum and 40 g of the above filler mixture was added. During stirring, an additional 0.49 g of triisobutylaluminum was added to give a very low viscosity fluid suspension of inorganic materials in the cyclohexane.

Polymerization was carried out in a magnetically stirred autoclave that had been dried under nitrogen purge while heating at 150° C. The above suspension was forced by nitrogen pressure from the blender cup through a polyethylene tube into the autoclave. The polymerization was carried out at an ethylene pressure of 100 psi and a 70° C. temperature.

In 46 minutes, 55 g of powder containing 29.26% carbon, which is equivalent to 34.5% polyethylene, was formed. The polymer had an inherent viscosity of 19.32. The composite had a 10-second micronization homogeneity of 86% and a micronization homogeneity index of 71. Compression molded bars had the following physical properties:

| | | |
|---|---|---|
| Tensile (T): | 3069, | 3241 psi |
| Elongation ($E_b$): | 101, | 64% |
| Modulus ($M_i$): | 706,600, | 635,700 psi |
| 0° F. Izod impact: | 2.0, | 1.8 ft lb/in of notch |
| −40° F. Izod impact: | 1.4, | 1.3 ft lb/in of notch |
| 264-psi Heat deflection: | 75, | 75° C. |

A strip of film, hot pressed from this product, was hot drawn 5 diameters, but could not be drawn at 25° C.

EXAMPLE 8

The procedure of Example 7 was repeated except that an additional 0.5 g of triisobutylaluminum was added to the dispersion before polymerization, and the polymerization was continued for a longer period of time. In 2 hours and 20 minutes, 77 g of powder having a filler content of 52%, calculated from the materials used, was formed. The polyethylene had an inherent viscosity of 19.71. The composite had a 10-second micronization homogeneity of 86% and a micronization homogeneity index of 69. Test bars compression molded at 175° C. had the following physical properties:

| | |
|---|---|
| Tensile (T): | 3550 psi |
| Elongation ($E_b$): | 390% |
| Modulus ($M_i$): | 434,000 psi |
| 0° F. Izod impact: | 17.0 ft lb/in of notch |
| −40° F. Izod impact: | 14 ft lb/in of notch |
| 66 psi heat deflection: | 110, 112° C. |

EXAMPLE 9

Example 8 was repeated using a uniform mixture of 255 g of titanium dioxide-coated "Harwick" GK kaolinite clay (Example 7, first paragraph) and 45 g of "Kadox" 15 zinc oxide (N.J. Zinc Co., weight-average equivalent spherical particle diameter 0.11μ). The mixture was dried at 600° C. To the polymerization medium was added 50 g of this filler mixture and the polymerization was carried out for 5 hours and 42 minutes. The product was 75 g of powder having a filler content of 65.5%. The composite had a 10-second micronization homogeneity of 88% and the polymer had an inherent viscosity of 20.06. The physical properties of compression molded test bars were as follows:

| | |
|---|---|
| Tensile (T): | 3032 psi |
| Elongation ($E_b$): | 206% |
| Modulus ($M_i$): | 577,000 psi |
| 0° F. Izod impact: | 5.3 ft lb/in of notch |

EXAMPLE 10

This example illustrates the preparation of a composite containing an ethylene/propylene copolymer.

A 400-g portion of "Harwick" 50-R kaolinite clay (Harwick Standard Chemical Co., weight-average equivalent spherical particle diameter of 0.55μ, total Ti content of 0.25 milligram-atom of Ti per gram) was placed in a 2-liter beaker between layers of glass wool. The mixture was heated to 300° C. and nitrogen was passed up through the bed by means of a dip stick. After 8 hours, the clay temperature was adjusted to 160° C. and three 10 ml portions of TiCl$_4$ were injected at 2-hour intervals into the lower glass wool layer. Then nitrogen was again passed through the clay at 160° C. to remove excess TiCl$_4$. The material at 25° C. was exposed to air at 25° C. to hydrolyze adsorbed TiCl$_4$. The titania-modified clay was then dried at 600° C. for 18 hours under a 30 l/hr flow of a 3:1 N$_2$:O$_2$ gas mixture and cooled in a nitrogen flow.

A 400-ml, dry, oxygen-free, shaker tube was charged with a suspension of 40 g of the above dried, titania-modified clay in 150 ml of dry, deoxygenated cyclohexane containing 1 g of triisobutylaluminum. The reactor was closed, charged with 150 g of propylene, and heated to 80° C. The propylene developed a pressure of 300 psi. The pressure was increased by 100 psi with ethylene. After 6 hours, 35 g of ethylene was consumed.

The ethylene-propylene copolymer/filler composite weighed 72 g and contained 55% clay. The polymer had an inherent viscosity of 9.80. A film pressed at 150° C. from the product was rubbery and could be cool drawn. The drawn part was also rubbery.

EXAMPLE 11

This example illustrates the preparation of a composite from a hydrogenated and titanated clay.

(A) A mixture of 500 g of "Harwick" GK kaolinite clay (Example 1), 500 ml of cyclohexane and 75 ml of tetraisopropyl titanate was rod milled for 1 day and the solid collected on a filter. The filter cake was washed with cyclohexane, air-dried and pulverized in a blender. It contained 1.91% Ti. The titania-modified clay was calcined at 600° C. under a 30-liter/hour flow of hydrogen for 18 hours and exposed to air. A 70-g portion of the hydrogenated product was oxidized by heating at 600° C. for 18 hours under a 30-liter/hour flow of a 4:1 N$_2$:O$_2$ mixture. The calcined clay contained 0.47 milligram-atom of Ti per gram.

The oxygenated clay was charged into an autoclave with 650 ml of cyclohexane and 0.792 g of triisobutylaluminum, and polymerization carried out at 70° C. and an ethylene pressure of 100 psi for 40 minutes. This yielded 93 g of a powdered product that was found to contain 69.66% clay by ash analysis and had a 10-second micronization homogeneity of 88%.

The physical properties of test bars compression molded at 175° C. and 2000 psi were:

| | | |
|---|---|---|
| Tensile (T): | 3401, | 3469 psi |
| Elongation ($E_b$): | 178, | 200% |
| Modulus ($M_i$): | 965,500, | 837,100 psi |
| 0° F. Izod impact: | 1 ft lb/in of notch | |
| 264-psi Heat deflection: | 90° C. | |
| Rockwell hardness (R scale): | 85 | |

(B) A repetition of the above polymerization yielded 85 g of powder in 23 minutes reaction time. The product was found by ash analysis to have a clay content of 71.86%. The polymer had an inherent viscosity of 14.77. The physical properties of test bars compression molded at 175° C. and 2000 psi were as follows:

| | | |
|---|---|---|
| Tensile (T): | 3439, | 3421 psi |
| Elongation ($E_b$): | 44, | 10% |
| Modulus ($M_i$): | 1,280,000, | 1,111,000 psi |
| 0° F. Izod impact: | 1.5 ft lb/in of notch | |
| 264-psi Heat deflection: | 98° C. | |

EXAMPLE 12

Alumina hydrate, "Alcoa Hydral" 710, having a surface area of 6–8 m$^2$/g and a weight-average equivalent spherical particle diameter of 1μ, was placed between 1-in layers of glass wool in a 3-liter beaker in a heating mantle. Dry nitrogen was passed through the bed for 2 hours at 160° C. Then the nitrogen flow was stopped and 3 successive 10-ml portions of TiCl$_4$ was vaporized through the alumina hydrate. The mass was cooled under nitrogen flow and stirred for 2 hours with 500 ml of distilled water containing 21 ml of concentrated aqueous ammonia. The solid was collected by filtration and washed with water. The absorbed TiCl$_4$ was converted to TiO$_2$ by exposing the product to moist air for 2 days. Before using, the filler was dried at 150° C. for 18 hours under a flow of 30 l/hr of dry nitrogen.

A slurry of 50 g of the above alumina, 1 g of antimony trioxide, 500 ml of cyclohexane and 0.6 g of triisobutylaluminum was transferred to a 1-liter autoclave. The polymerization was carried out at 70° C. and an ethylene pressure of 100 psi for 1 hour and 16 min.

The product, 88 g of powder, had an ash content of 38.07%, which is equivalent to 57.8% filler. The polymer had an inherent viscosity of 17.29. The composite had a 10-second micronization homogeneity of 98%. The physical properties of compression molded test bars were as follows:

| Tensile (T): | 3,154, | 3,010 psi |
|---|---|---|
| Elongation (E$_b$): | 498, | 464% |
| Modulus (M$_i$): | 317,000, | 322,000 psi |
| 0° F. Izod impact: | 15.2 ft lb/in of notch | |
| Rockwell hardness: | 66 | |
| Oxygen index: | 0.325 | |

EXAMPLE 13

(A) A 200-g batch of "Alcoa" C-30BF Al$_2$O$_3$.3H$_2$O having a surface area of 1.6 m$^2$/g and a screen analysis of 1–3% on 200 mesh, 15–20% on 325 mesh and 80–85% through 325 mesh was placed between 1-in layers of glass wool in a 3-liter beaker in a heating mantle. Dry nitrogen was passed through the bed for 2 hours at 160° C. Then the nitrogen flow was stopped and 3 successive 10-ml portions of TiCl$_4$ were vaporized through the alumina hydrate. The mass was cooled under nitrogen flow (analysis: Cl, 0.54%; Ti, 0.60% or 0.13 milligram-atom of Ti per gram of filler), and stirred for 2 hours with 500 ml of distilled water containing 21 ml of concentrated aqueous ammonia. The solid was collected by filtration and washed with water (analysis: Cl, 140 ppm; Ti, 0.60%). The filler was dried at 170° C. for 18 hours under a 30-liter per hour flow of nitrogen before using.

A 2-gallon, stirred autoclave, previously dried and deoxygenated with nitrogen, was charged with 0.7 gallon of dry, deoxygenated cyclohexane and a mobile suspension of 500 g of TiO$_2$-modified "Alcoa" C-30BF alumina trihydrate in 1895 ml of dry, deoxygenated cyclohexane containing 3.6 g of triisobutylaluminum. The polymerization was carried out at 70° C. under an ethylene pressure of 100 psi for 1 hr and 41 min. The product was collected by filtration and air dried.

The ash content of the product was 43.11%, which is equivalent to 66% alumina trihydrate. The physical properties of compression molded test bars were as follows:

| Tensile (T): | 2813, | 2814 psi |
|---|---|---|
| Elongation (E$_b$): | 337, | 295% |
| Modulus (M$_i$): | 424,000, | 425,000 psi |
| 0° F. Izod impact: | 9.3 ft lb/in of notch (no break) | |
| Flexural modulus: | 379,000, | 386,000 psi |
| Oxygen index: | 0.342, | 0.342 |

To a suspension of approximately 700 g of this product of 1.5 l of cyclohexane was added 2.1 g of "Irganox" 1010 dissoled in 50 ml of ether. The mixture was stirred for several minutes before the solid was collected by vacuum filtration and air dried.

(B) Part (A) was repeated using a polymerization time of 1 hour and 57 minutes. The ash content was 43.33%, which is equivalent to 66.2% Al$_2$O$_3$.3H$_2$O. Compression molded test bars had the following properties:

| Tensile (T): | 2845, | 2742 psi |
|---|---|---|
| Elongation (E$_b$): | 287, | 289% |
| Modulus (M$_i$): | 479,000, | 448,000 psi |
| Flexural modulus: | 366,000, | 349,000 psi |
| Oxygen index: | 0.325, | 0.342 |

(C) Part (A) was repeated using a polymerization time of 2 hours and 27 minutes. The ash content was 43.53%, which is equivalent to 66.6% Al$_2$O$_3$.3H$_2$O. The physical properties of compression molded test bars were:

| Tensile (T): | 2434, | 2603 psi |
|---|---|---|
| Elongation (E$_b$): | 171, | 260% |
| Modulus (M$_i$): | 458,000, | 451,000 psi |
| 0° F. Izod impact: | 9.2 ft lb/in of notch (no break) | |
| Flexural modulus: | 388,000, | 353,000 psi |
| Oxygen index: | 0.342, | 0.342 |

(D) The three stabilized composites prepared in (A), (B) and (C) above were mixed in a rolling drum and the mixture was put through the continuous vulcanizer of Example 5. In this procedure, the powder was fed onto the stainless steel belt, squeezed between the rolls without shear, and carried around the heated belt at 400° F. and a speed of 1.8 ft/min. The sheet was manually removed from the roll. The physical properties of the composition sheet measured in two directions were as shown in Table III. The properties of test bars compression molded at 175° C. and a pressure of 2000 psi are also given.

TABLE III

|  | T (psi) | M$_i$ (kpsi) | E$_b$ (%) |
|---|---|---|---|
| Machine Directions | 2564 | 429 | 137 |
| Transverse Directions | 2534 | 434 | 135 |
| Compression Molded | 2537 | 454 | 215 |

The sheet was molded into pyramidal objects by the method of Example 5. An Izod impact test at room temperature was performed on samples cut from the side of the formed pieces.

| Forming Temperature, °C. | 0° F. Izod Impact, ft lb/in of notch |
|---|---|
| 125 | 8.2 |
| 140 | 9.7 |
| 150 | 7.5 |
| Unformed sheet | 8.2 |

EXAMPLE 14

This example illustrates the preparation of a composite using a water-soluble chromium salt as the transition metal compound.

"Harwick" GK kaolinite clay (Example 1) was calcined at 600° C. to remove essentially all water of hydration, and then cooled. A 1000-g portion of the clay was made into a slurry with 1100 ml of distilled water containing 1.24 g of chromium(III) acetate monohydrate. The slurry was tumbled in a rod mill for 2 hours. The pH remained essentially constant at 5.5–6. Finally, the solid was isolated, and the aqueous solution was noted to be lighter in color than the original solution. The treated clay was dried at 180° C. in a stream of nitrogen.

A 1-gal autoclave was dried at 150° C. under nitrogen purge and charged under nitrogen purge with 1000 ml of dried cyclohexane and 2 ml of a 1.6 molar solution of triethylaluminum. Next, a slurry was added, comprising 180 g of the above treated kaolinite clay and 800 g of dried heptane containing 4 ml of a 1.6 molar solution of triethylaluminum. The autoclave was closed and heated to 60° C. The polymerization was carried out under an ethylene pressure of 150 psi during 2.16 hours. The product (370 g) was isolated, after rinsing with methanol and drying, as a fine, white powder.

The composite was found by ash analysis to contain 46.2% clay. The polymer had an inherent viscosity of 11.60. The composite had a 10-second micronization homogeneity of 87% and a micronization homogeneity index of 69. A sample of this composition was compression molded at 175° C. into test bars that had the following properties:

| Tensile (T): | 3300 psi |
|---|---|
| Elongation ($E_b$): | 500% |
| Modulus ($M_i$): | 433,000 psi |
| 0° F. Izod impact: | 2.4 ft lb/in of notch |

EXAMPLE 15

This example shows the use of dehydrated kaolinite and Cr(OAc)$_3$ at low polymerization temperature.

A slurry was made from 1000 gof "Satintone" No. 1 dehydrated kaolinite clay (Engelhard Mineral Co.), having a weight-average effective spherical particle diameter of 2 microns and a surface area of 8.2 m$^2$/g, and 1.2 liters of a solution containing 1.24 g of chromium(III) acetate monohydrate. The slurry was mixed in a rod mill for 20 hours, and then 30 ml of a 1% ammonium hydroxide solution was added to raise the pH of the slurry to 5. After a total of 50 hours in the mill, the slurry was filtered to isolate the solid. The aqueous solution was noted to be lighter in color than the original chromium(III) acetate solution. The collected solid was washed with 400 ml of acetone and dried at 170°–190° C. in a stream of nitrogen.

A 1-gal autoclave was dried at 150° C. under nitrogen purge and charged under nitrogen purge with 0.35 gal of dried cyclohexane and 2 ml of a 1.6 molar solution of triethylaluminum in hexane. To this was added a slurry comprising 159 g of the above treated kaolinite, 750 ml of dried heptane and 4 ml of a 1.6 molar solution of triethylaluminum in hexane. The autoclave was closed and the polymerization was carried out during 3 hours and 50 minutes at 35° C. under an ethylene pressure of 100 psi.

The product (334 g), isolated as a fine white powder after rinsing with methanol and drying, was determined to contain 53.5% by weight of clay by ash analysis. The polymer had an inherent viscosity of 16.05. The composite had a 10-second micronization homogeneity of 87% and a micronization homogeneity index of 65. Bars, compression molded at 175° C. and 1500–2000 psi, had the following properties:

| Tensile (T): | 3232 psi |
|---|---|
| Elongation ($E_b$): | 346% |
| Modulus ($M_i$): | 577,000 psi |
| 73° F. Izod impact: | 14.8 ft lb/in of notch |

EXAMPLE 16

This example shows the use of wollastonite as the filler.

A slurry was prepared from 800 g of "Cab-O-Lite" F1 wollastonite (calcium silicate, Cabot Corporation, particle size distribution by sedimentation, cumulative percent, 55% greater than 55μ, 45% less than 20μ, 22% less than 10μ, 13% less than 5μ, 9% less than 3μ, 7% less than 1μ, fiber lengths average 13–15 times diameter) in 1400 ml of distilled water containing 1 g of chromium(III) acetate monohydrate and 5 ml of isopropyl alcohol. The initial pH was 4, but gradually rose to 6.5 during 4 days as the slurry was mixed in a rod mill. The solid was isolated by filtration and dried in a stream of nitrogen at 170° C. For each gram of wollastonite 0.0026 mmole of chromium acetate was used.

A 1-gal autoclave was dried at 150° C. under nitrogen purge, cooled and charged, in order, with 1.5 liters of dried heptane, 2 ml of a 1.6 molar solution of triethylaluminum, 200 g of the wollastonite prepared above, and finally, an additional 3 ml of the 1.6 molar solution of triethylaluminum. The autoclave was closed and the mixture was stirred for 10 minutes under nitrogen. The polymerization was then carried out at 65° C. for 38 hours under an ethylene pressure of 350 psi.

The product (276 g) was isolated as a fine, white powder after rinsing with methanol and drying. Ash analysis indicated that it contained 70.6% filler. The polymer had an inherent viscosity of 10.06. The composite had a 10-second micronization homogeneity of 76% and a micronization homogeneity index of 52%. Bars, compression molded at 175° C. and 2000–3000 psi, had the following properties:

| Tensile (T): | 2647 psi |
|---|---|
| Elongation ($E_b$): | 8.3% |
| Modulus ($M_i$): | 1,064,000 psi |
| 73° F. Izod impact: | 1.4 ft lb/in of notch |

EXAMPLE 17

This example shows the use of chromium-modified talc as the filler.

A slurry was prepared from 1000 g of undried talc in 1250 ml of distilled water containing 5 ml of 1% NH$_4$OH solution and 10 ml of "Volan" L [E. I. du Pont de Nemours and Company, a solution containing 6% Cr(III) as methacrylatochromium chloride, special low-chloride composition]. To this slurry was added 100 ml of isopropyl alcohol. The pH of the slurry was 5.0 and remained constant during 24 hours of mixing of the slurry in a ball mill with stones. The slurry was separated from the stones and the solid was isolated by filtrations, washed with about 500 ml of acetone, and dried in air and then in a stream of nitrogen at 190° C. For each gram of talc, 0.01 milligram-atom of Cr(III) was used.

A 1-gal autoclave was dried at 150° C. under nitrogen purge, cooled, and charged with 1.3 liters of dried heptane and 2 ml of a 1.6 molar solution of trimethylaluminum in hexane. Next, 194 g of the talc prepared above was made into a slurry in 750 ml of dried heptane containing 5 ml of a 1.6 molar solution of trimethylaluminum in hexane, and the whole slurry was transferred to the autoclave. The autoclave was closed and the polymerization was carried out at 55° C. for about 10 hours under an ethylene pressure of 150 psi.

The product (299.5 g) was a fine, white granular powder, after rinsing with methanol and drying. It was calculated to contain 58.6% talc based on the materials used. The composite had a 10-second micronization homogeneity of 91% and a micronization homogeneity index of 82. Bars molded from this composition at 175° C. and 2000 psi pressure had the following physical properties:

| | |
|---|---|
| Tensile (T): | 2644 psi |
| Elongation ($E_b$): | 150% |
| Modulus ($M_i$): | 631,500 psi |
| 0° F. Izod impact: | 3.4 ft lb/in of notch |

EXAMPLE 18

A 2-gallon autoclave fitted with a magnetically driven stirrer was prepared for the polymerization by pressuring to 20 psi of ethylene and venting 3 times at 150° C. followed by 3 hours of nitrogen purging at 150° C. The autoclave was charged with 0.7 gal of deoxygenated, dry hexane.

The reaction mixture was prepared in a dry, nitrogen-purged, 1-gallon, round bottom flask fitted with food-blender blades in the bottom. The flask was charged with 500 g of "Alcoa" C-30BF $Al_2O_3.3H_2O$ (Example 13), dried at 160° C. under a 60-l/hr stream of nitrogen for 18 hours and having a surface area of about 1.6 m²/g, 0.6 gallon of dry, deoxygenated cyclohexane, and 18 mmol of triisobutylaluminum. The mixture was blended to a low-viscosity uniform suspension. Then 0.22 g of tetrabenzylzirconium, as a freshly made solution in 5 ml of toluene, was added to the stirred suspension. This pale orange mixture was transferred by a 1-2 psig nitrogen pressure in the flask through polyethylene tubing into the autoclave. The polymerization was carried out at 60° C. and an ethylene pressure of 100 psi with the stirrer at 500 rpm. The reaction was stopped after 220 g of ethylene was consumed, which took 25 minutes. The alumina trihydrate contained approximately 0.005 milligramatom of Zr per gram.

The product was collected by filtration and air dried, giving 682 g of powder which passed a 28-mesh screen, and contained 74.0% $Al_2O_3.3H_2O$ (ash, 48.49%). Test bars compression molded from the powder at 170° C. and 2000 psi had the following properties:

| | | |
|---|---|---|
| Tensile (T): | 2507, | 2545 psi |
| Elongation ($E_b$): | 309, | 323% |
| Modulus ($M_i$): | 541,600, | 501,300 psi |
| 0° F. Izod impact: | 4.9 ft lb/in of notch | |

EXAMPLE 19

This example illustrates the importance of not contacting the filler initially with a zirconium compound.

(A) A 1-liter, magnetically driven autoclave was dried at 150° C. by first evacuating to a pressure of 0.5 mm of Hg for 2 hrs and then purging for 3 hours at 150° C. with nitrogen. "Harwick" GK kaolinite clay (Example 3) was dried at 600° C. for 18 hours under a 30-liter/hour flow of 4:1 $N_2:O_2$ mixture and allowed to cool in nitrogen. The resulting clay had a surface area of 7.4 m²/g. The reaction mixture was prepared as a low-viscosity suspension by adding 50 g of the dry clay to a dry enclosed blender cup under nitrogen purge containing 500 ml of dry, deoxygenated cyclohexane and 3 mmiol of triisobutylaluminum. After stirring the aforementioned ingredients, 0.22 g (0.01 mmol/g of clay) of tetrabenzylzirconium was added. The pale pink-orange mixture was transferred through polyethylene tubing into the autoclave by a 1-2 psig nitrogen pressure applied to the blender cup. The polymerization was carried out at 70° C. under an ethylene pressure of 100 psi for 2 hours and 3 minutes.

The powdery product, 98 g, was found by ash analysis to have a clay content of 46.45%. The polymer had an inherent viscosity of 15.01. The composite had a 10-second micronization homogeneity of 73% and a micronization homogeneity index of 48. Compression molded test bars had the following physical properties:

| | | |
|---|---|---|
| Tensile (T): | 3108, | 3532 psi |
| Elongation ($E_b$): | 353, | 448% |
| Elongation ($E_b$): | 353, | 448% |
| Modulus ($M_i$): | 360,700, | 403,800 psi |
| 0° F. Izod impact: | 19 ft lb/in of notch | |

(B) For comparison, the above procedure was repeated, except that no clay was added and 0.50 g of tetrabenzylzirconium was used. When ethylene was processed with the resulting mixture at 60° C. and 100 psi for 3 hr and 14 min, only 0.1 g of polymer was formed.

(C) For further comparison, the procedure of this example was repeated except for the following changes:
1. The filler was 70 g of "Alcoa" C-30BF $Al_2O_3.3H_2O$ (Example 13), dried at 150° C. for 18 hr under a 30-l/hr flow of nitrogen.
2. The amount of tetrabenzylzirconium added was 0.050 g (0.0014 milligram-atom of Zr per gram of filler).
3. The tetrabenzylzirconium was added before the triisobutylaluminum.
4. The reaction with ethylene was carried out for 3 hr and 36 min at 60° C.

During the 3 hr and 36 min period, only 21 g of ethylene was taken up, and only 2 g in the last 58 min. The 21 g corresponds to a composite containing only 23% polyethylene (53.5% in the product of Part A). The product was lumpy and heterogeneous in appearance. Compression molded test bars had the following physical properties.

| | | |
|---|---|---|
| Tensile (T): | 1236, | 1400 psi |
| Elongation ($E_b$): | 7.4, | 1.1% |
| Modulus ($M_i$): | 575,700, | 576,700 psi |
| 0° F. Izod impact: | 0.86, | 0.85 ft lb/in of notch |

(D) For still further comparison, the procedure of the immediately preceding comparative example was repeated except that 0.1 g (0.0028 mmol per gram of filler) of tetrabenzylzirconium and no triisobutylaluminum was added. Only a trace of polymerization took place after 3 hours.

EXAMPLE 20

A mixture of 200 g of bentonite clay, 80 ml of tetraisopropyl titanate, and 500 ml of dry cyclohexane was shaken briefly and allowed to stand for one day. The solid was separated by filtration, washed with dry cyclohexane, and air dried. A portion of the product was dried at 600° C. for 18 hours under a stream of 4:1 $N_2:O_2$ mixture flowing at 30 l/hr.

Deoxygenated cyclohexane (600 ml) was passed through a bed of Woelm acid alumina into an enclosed blender cup under constant nitrogen pressure. Stirring was started, and 0.1 mmol of triisobutylaluminum was added, followed by 60 g of dried product and an additional 0.3 mmol of triisobutylaluminum. The low-viscosity dispersion thus obtained was transferred with nitrogen pressure through polyethylene tubing to a stirrer-equipped, stainless steel autoclave that had been dried under a nitrogen purge at 150° C. The autoclave was closed, stirring was started, the mixture was heated to 70° C., ethylene was admitted to 100 psi, and these conditions were continued until 45 g of ethylene had reacted (1 hour and 15 min). After cooling, the solid was separated by filtration and air dried.

There was thus obtained 93 g of polyethylene/bentonite composite as a powder that gave on ash analysis by combustion a filler content of 48.55%. The polymer had an inherent viscosity of 14.74. The composite had a 10-second micronization homogeneity of 99% and a micronization homogeneity index of 90.

A hot-pressed film prepared from this composite was strong and flexible and creased without cracking. Compression molded bars had the following properties:

| Tensile (T): | 3994, | 4598 psi |
| Elongation ($E_b$): | 196, | 334% |
| Modulus ($M_i$): | 399,000, | 293,000 psi |
| 0° F. Izod impact: | 7.2, | 7.4 ft lb/in of notch |

EXAMPLE 21

This example illustrates the preparation of composite from diatomaceous earth.

A 247-g portion of "Celite" diatomaceous earth (silica, Johns-Manville) having a surface area of 10–20 $m^2/g$ was placed between two layers of glass wool in a 2-liter beaker, the system was heated to 160° C., and nitrogen was passed through the mineral bed for 18 hours. The nitrogen was stopped, and three 8-g portions of titanium tetrachloride were placed in the bottom of the beaker through a syringe at 2-hr intervals with the temperature still at 160° C. The system was then purged with nitrogen for two hours. The mineral was stirred overnight with water containing enough ammonium hydroxide to make the mixture slightly basic. The mixture was filtered, and the solid on the filter was washed with water until the fresh washings were free of chloride ion. The wet solid was suspended in water, and the suspension was put through an 80-mesh screen, and the solid was separated by filtration and dried at 100° C. It contained 0.38% Ti (0.08 milligram-atom of Ti per gram of filler). A portion of the product was further dried at 500° C. for 18 hours in a stream of 4:1 $N_2O_2$ mixture flowing at 30 l/hr and cooled in a stream of nitrogen.

Deoxygenated cyclohexane (500 ml) was passed through a bed of Woelm acid alumina into an enclosed blender cup under constant nitrogen pressure. Stirring was started, and 1 mmol of triisobutylaluminum was added, followed by 50 g of dried filler and an additional 2 mmol of triisobutylaluminum. The low-viscosity dispersion thus obtained was transferred with nitrogen pressure through polyethylene tubing to a stirrer-equipped, stainless steel autoclave that had been dried under a nitrogen purge at 150° C. The autoclave was closed, stirring was started, the mixture was heated to 70° C., ethylene was admitted to 100 psi, and these conditions were continued for 10 hours. After cooling, the solid was separated by filtration and air dried.

The product was 103 g of a polyethylene/diatomaceous earth composite that was found by ash analysis to contain 38.92% filler. The polymer had an inherent viscosity of 23.33. The composite had a 10-second micronization homogeneity of 69% and a micronization homogeneity index of 55. Compression molded bars had the following physical properties:

| Tensile (T): | 4245, | 4196 psi |
| Elongation ($E_b$): | 301, | 295% |
| Modulus ($M_i$): | 514,000, | 535,000 psi |
| 0° F. Izod impact: | 4.8, | 5.4 ft lb/in of notch |

EXAMPLE 22

"Harwick" GK kaolinite clay (Example 3) that had been calcined overnight at 1200° C. in air to give a surface area of 4.5 square meters per gram was redried by heating at 500° C. for 18 hours in a stream of 4:1 $N_2:O_2$ mixture flowing at 30 l/hr and cooled in a stream of nitrogen.

Deoxygenated cyclohexane (600 ml), 70 g of the dried clay, and a total of 0.4 mmol of triisobutylaluminum were mixed and processed with ethylene at 50° C. and 100 psi by essentially the procedure of Example 20. The polymerization was stopped after 27 g of ethylene had reacted (25 min).

The product was 77 g of a polyethylene/clay composite which passed through a 28-mesh screen, plus 6 g of coarser material, which was discarded. Ash analysis by combustion indicated that the composite had a 69.40% clay content. The polymer had an inherent viscosity of 23.50. Compression molded bars had the following properties:

| Tensile (T): | 2435, | 2284 psi |
| Elongation ($E_b$): | 315, | 314% |
| Modulus ($M_i$): | 567,000, | 720,000 psi |
| 0° F. Izod impact: | 9.3 ft lb/in of notch | |
| 264-psi Heat deflection: | 85°, | 87° C. |

EXAMPLE 23

This example illustrates the formation of objects from a composite by cold compressing and sintering.

A 1500-g batch of "Alcoa" C-333 $Al_2O_3.3H_2O$ having a screen analysis of 99% through 325 mesh, 94–99% less than 30$\mu$, 85–93% less than 20$\mu$, 56–67% less than 10$\mu$, 20–40% less than 5$\mu$, and a median particle size of 6.5 to 9.5$\mu$, was placed between 1-in layers of glass wool in a 3-liter beaker in a heating mantle. Dry nitrogen was passed through the bed for 2 hours at 160° C. Then the nitrogen flow was stopped and 3 successive 15-ml portions of TiCl$_4$ spaced 2 hr apart were vaporized through the alumina hydrate. The mass was cooled under nitrogen flow and stirred for 14 hours with 2 liters of distilled water containing 100 ml of concentrated aqueous ammonia. The solid was collected by filtration, washed with distilled water until the filtrate was free of chloride ion, and air dried (analysis: Ti, 0.53% or 0.11 milligram-atom per gram). The filler was dried at 175° C. for 16 hours under a 30-liter per hour flow of nitrogen before using.

A charge of 400 g of the titanated alumina trihydrate suspended in 1845 ml of cyclohexane containing 18 mmol of triisobutylaluminum was transferred to a 2-gal autoclave which already contained 0.7 gal of cyclohexane. Polymerization was carried out at 70° C. and an ethylene pressure of 100 psi for 2 hours and 9 minutes and gave 592 g of powder.

The product was found to contain 63.6% Al$_2$O$_3$.3-H$_2$O by ash analysis. A melt pressed film from the product was easily oriented while cold. The physical properties of test bars compression molded at 175° C. and 3000 psi were:

| Tensile (T): | 3402, | 3330 psi |
|---|---|---|
| Elongation (E$_b$): | 408, | 395% |
| Modulus (M$_i$): | 415,017, | 421,765 psi |
| 0° F. Izod impact: | 11.5 ft lb/in of notch (no break) | |
| Oxygen index: | .305 | |

The powdery composite was fabricated by cold compacting and sintering as follows. The powder was pressed at ambient temperature to green forms having enough strength to be handled without special techniques followed by a heat-treatment above the melting point of the polymer. The hot piece was cooled uniformly to prevent warpage.

The data in Table IV demonstrate the effect of pressure variations in preparing the green sheets on the physical properties of the final product. The green sheets were sintered between brass plates in a circulating air oven and cooled slowly by wrapping the sheets and brass plates in glass wool insulation.

This procedure is a versatile method for preparing complicated shapes and sizes. Because the green forms shrink during sintering, it is necessary to make the green form larger than the desired object.

TABLE IV

| Compaction Pressure, psi | Density (green), g/cc | Density (sintered), g/cc | Tensile (T), psi | Elongation (E$_b$), % | Modulus (M$_i$), psi | 0° F. Izod impact, ft lb/in of notch |
|---|---|---|---|---|---|---|
| Sintered at 150° C. for 1 hr | | | | | | |
| 2000 | 1.11 | 1.27 | 2096 | 113 | 271,000 | 3.1 |
| 8160 | 1.34 | 1.44 | 3146 | 242 | 421,000 | 7.0 |
| 15000 | 1.48 | 1.47 | 3258 | 260 | 416,000 | 7.6 |
| 22000 | 1.49 | 1.46 | 3120 | 235 | 415,000 | 7.8 |
| Sintered at 200° C. for 20 min | | | | | | |
| 2000 | 1.13 | 1.25 | 1889 | 107 | 245,000 | 2.5 |
| 8760 | 1.38 | 1.40 | 3192 | 238 | 462,000 | 7.6 |
| 15000 | 1.46 | 1.47 | 3433 | 257 | 475,000 | 8.7 |
| 22000 | 1.49 | 1.48 | 3379 | 248 | 468,000 | 8.8 |
| Compression Molded Sample | | | 3366 | 402 | 418,000 | 11.5 NB |

NB = did not break

EXAMPLE 24

A mixture of 300 g of Concord mica and a solution of 50 g of tetraisopropyl titanate in 600 ml of cyclohexane was shaken briefly and allowed to stand for one day. The solid was separated by filtration, washed with dry cyclohexane, and air dried. A portion of the coated mica was dried at 300° C. for 18 hours under nitrogen. The dried mica contained 0.05 milligram-atom of Ti per gram.

Forty grams of the dried mica was mixed with 250 ml of deoxygenated cyclohexane and a total of 0.4 mmol of triisobutylaluminum, and the mixture was processed with ethylene at 70° C. and 300 psi, all by essentially the procedure of Example 21, until 27 g of ethylene had reacted (8 hr).

The polyethylene/mica composite was obtained as small, fluffy particles (71 g). It was found by ash analysis to contain about 56% mica. The polymer had an inherent viscosity of 27.77. The composite had a 10-second micronization homogeneity of 86% and a micronization homogeneity index of 72. Compression molded bars had the following properties:

| Tensile (T): | 1808 | 1805 psi |
|---|---|---|
| Elongation (E$_b$): | 22, | 20% |
| Modulus (M$_i$): | 491,000, | 753,000 psi |
| 0° F. Izod impact: | 1.8 ft lb/in of notch | |
| 264-psi Heat deflection: | 80° C. | |

EXAMPLE 25

This example illustrates the preparation of a composite containing zinc oxide as the filler.

A mixture of 300 g of "Kadox" 15 zinc oxide (Example 9), 60 g of tetraisopropyl titanate, and 400 ml of dry cyclohexane was shaken occasionally and allowed to stand for 7 hours. The solid was separated by filtration, washed with dry cyclohexane, and air dried. The filler contained 0.26 milligram-atom of Ti per gram. A portion of the product was dried at 500° C. for 18 hours under a stream of 4:1 N$_2$:O$_2$ mixture flowing at 30 l/hr and cooled under nitrogen.

By essentially the process of Example 20, a polymerization medium was made up from 250 ml of deoxygenated, dry cyclohexane, 0.5 mmol of triisobutylaluminum, 40 g of the dried, coated zinc oxide, and an additional 2.5 mmol of triisobutylaluminum, and the mixture was processed with ethylene at 70° C. and 50–100 psi in a shaker tube until 28 g of ethylene reacted (8 hr).

The polyethylene/zinc oxide composite thus obtained weighed 64 g which indicated that the composite contained about 62% zinc oxide. The polymer had an inherent viscosity of 25.93. The composite had a 10-second micronization homogeneity of 96% and a micronization homogeneity index of 85%. Test bars were prepared by preheating the composite in a mold at 175°

C. for 3 minutes, followed by compression at 2000 psi for 1 minute. These bars had the following properties:

| Tensile (T): | 2820, | 2799 psi |
|---|---|---|
| Elongation (E$_b$): | 126, | 145% |
| Modulus (M$_f$): | 275,000, | 241,000 psi |
| 0° F. Izod impact: | 19 ft lb/in of notch | |

EXAMPLE 26

This example illustrates the preparation of a composite from calcium hydrogen phosphate.

A batch of calcium hydrogen phosphate, CaHPO$_4$ (J. T. Baker Co.) was dried by heating at 250° C. for 18 hours under a stream of nitrogen flowing at 30 l/hr. By essentially the method of Example 19, 60 g of the dried mineral was mixed with 600 ml of dry, deoxygenated cyclohexane, 4 mmol of triisobutylaluminum, and a solution of 0.100 g of tetrabenzylzirconium (0.2 mmol) in 2 ml of toluene, and the mixture was processed with ethylene at 50° C. and 100 psi until 40 g of ethylene had reacted (3 hr and 43 min).

The polyethylene/CaHPO$_4$ composite thus produced consisted of 18 g of powder and 63 g of larger pieces of solid. Both gave strong hot-pressed films. The larger pieces were pulverized in a blender, after which the solid passed a 16-mesh screen. The product was found by ash analysis to have a filler content of 58.60%. Plaques (3.5×6.5 in) were prepared by preheating the composite in a mold at 180° C. for 3 min, followed by compression at 3000 psi for 2 min. Test bars cut from these plaques had the following properties:

| Tensile (T): | 2231, | 2202 psi |
|---|---|---|
| Elongation (E$_b$): | 418, | 395% |
| Modulus (M$_f$): | 327,000 | 373,000 psi |
| 0° F. Izod impact: | 8.7, | 8.6 ft lb/in of notch (hinge break) |
| Oxygen index: | 0.227 | |

EXAMPLE 27

This example illustrates the preparation of a composite from calcium carbonate which has been coated with alumina.

(A) A 1200-g portion of "Gamma Sperse" 80 calcium carbonate (Georgia Marble Co.), having a surface area of 3.6 m$^2$/g and a weight-average effective spherical particle diameter of 2.2μ, was suspended in 2 liters of water by stirring at 25° C. for 10 minutes. A solution of 57 g of AlCl$_3$.6H$_2$O in 400 ml of water was added dropwise with stirring over 15 minutes, and the mixture was stirred for one hour and divided into two equal parts. One part was filtered, and the solid on the filter was washed with water until the fresh washings were free of chloride ion and then dried. It contained 1.3% Al by X-ray fluorescence. The product was dried additionally at 250° C. for 18 hours under nitrogen flowing at 100 l/hr.

A 2-gal, stainless steel autoclave with a magnetically driven stirrer was dried and deoxygenated by purging three times at 150° C. with ethylene at 50 psi, purging at 150° C. for three hours with nitrogen, and cooling under nitrogen. It was charged with 0.65 gal of dry, deoxygenated hexane at 25° C.

Five hundred grams of the dried, alumina-coated calcium carbonate was charged under nitrogen to a creased, 5-liter, round-bottom flask fitted with a food blender blade assembly and containing 18 mmol of triisobutylaluminum added as a 1 M solution in heptane and 0.7 gal of dry, deoxygenated cyclohexane. The mixture was stirred briefly to give a low-viscosity dispersion, and 0.25 g of tetrabenzylzirconium was added. The mixture changed rapidly from yellow to orange. The filler contained approximately 0.00011 milligramatom of Zr per gram. The dispersion was transferred under nitrogen pressure through a polyethylene tube to the autoclave, and the system was heated to 70° C. and pressured with ethylene at a maximum pressure of 69 psi with stirring until 410 g of ethylene had reacted (24 min). The solid polyethylene/calcium carbonate composite thus formed was isolated by filtration, washed with cyclohexane, and dried.

The product consisted of 1000 g of a powder that passed a 12-mesh screen, plus 40 g of coarser particles. The powder was found by ash analysis to contain 49.5% CaCO$_3$. The polymer had an inherent viscosity of 22.93. The composite had a 10-second micronization homogeneity of 76% and a micronization homogeneity index of 38. A ⅛-in sheet compression molded at 175° C. and 2000 psi was cut into test bars which had the following properties:

| Tensile (T): | 3498, | 3229 psi |
|---|---|---|
| Tensile (T) at 70° C.: | 3784 psi | |
| Elongation (E$_b$): | 386, | 309% |
| Elongation (E$_b$) at 70° C.: | 890% | |
| Modulus (M$_f$): | 227,000, | 262,000 psi |
| 0° F. Izod impact: | 13.4, | 13.6 ft lb/in of notch |
| 264-psi Heat deflection: | 54.5, | 55° C. |

(B) In contrast, when 425 g of calcium carbonate that had not been coated with alumina was treated with ethylene with the same catalyst system, at 60° C. and 100 psi, only 50 g of ethylene reacted in two hours.

EXAMPLE 28

This example illustrates the preparation of composites using tetrabenzyltitanium as the hydrocarbon-soluble organic transition metal compound.

Up to the start of the polymerization, all operations were carried out under dry nitrogen. Two liters of reagent-grade cyclohexane was passed through a 3-inch bed of Woelm acid alumina into a 5-liter, round-bottom flask fitted with a blender in its base. Stirring was started, and 7.5 mmol of triisobutylaluminum was added from a syringe, followed 10-15 seconds later by 185 g of "Harwick" GK kaolinite clay (Example 1) that had been dried at 265°-275° C. for 16 hr in a stream of nitrogen and cooled under nitrogen. After stirring for one minute, a solution of 90 mg of tetrabenzyltitanium in 6 ml of toluene was added from a syringe and the suspension was stirred vigorously for five minutes. The clay contained approximately 0.001 milligram-atom of Ti per gram.

The suspension was then transferred through polyethylene tubing under nitrogen pressure to a dry, oxygenfree, ordinary-steel autoclave equipped with a stirrer. The stirrer was run at 1000 rpm during the addition and the subsequent polymerization. The autoclave was heated to 60° C., the nitrogen was replaced by sufficient ethylene (45 g) to reach a pressure of 100 psi, and the system was heated at 60° C. and maintained at 100 psi until an additional 90 g of ethylene had been added. The aim was to form an approximately 67/33 clay/polyethylene composite. The time required was 1.12 hr. The autoclave was immediately vented to atmospheric pressure and cooled, and the solid composite was separated by filtration and air dried to give 261.9 g of powder that passed a 28-mesh screen.

A portion of the product was added to a $CHBr_3:CCl_4$ mixture (1:1); all the powder floated, indicating that no unattached clay particles were present, i.e., all the clay particles had been coated with polyethylene. In a similar test with $CCl_4:n-C_3H_7OH$ (3:2 by volume), all the powder sank, indicating that no clay-free polyethylene was present. The product was found on ash analysis to have a clay content of 64.0%. The additional data obtained are given in Table V.

EXAMPLES 29-33

These examples illustrate the preparation of composites using a variety of hydrocarbon-soluble organic transition metal compounds.

By essentially the procedure of Example 28, polyethylene/clay composites were made with other catalysts in place of tetrabenzyltitanium. These runs, together with the properties of the products, are summarized in Table V. The Gardner impact strength data were obtained on compression molded samples having the mil thicknesses indicated in parenthesis in the table.

EXAMPLES 34-38

Using the procedure of Example 28, a variety of hydrocarbon-soluble organic transition metal compound catalyst components were used to make polyethylene/alumina trihydrate composites. Two hundred grams of "Alcoa" C-30BF alumina trihydrate (Example 13) was used in each run, the objective being to make an approximately 69/31 alumina trihydrate/polyethylene composite. With the exception of Example 34, each run was continued until 90 g of ethylene had reacted. In Example 34 the polymerization was stopped after 46 g of ethylene had reacted. The results are summarized in Table VI.

TABLE VI

| | | | | | | | | | Product properties | | | |
|---|---|---|---|---|---|---|---|---|---|---|---|---|
| | | | | | | | | | | Impact Strength | | |
| | | Mmol iBu$_3$Al: Mmol | Polymerization, | % | Inh. | T, | E$_b$, | M$_i$, | 25° C. Gardner, | 0° F. Izod: lb/in of | Micron. Homo. | Micron. Homo. |
| Ex. | Catalyst | Catalyst | psi/hr | filler | Visc. | psi | psi | kpsi | in lb (mils) | notch | % | Index |
| 34 | tetrabenzyl-titanium | 4.0:0.2 | 200/3.45 | 82.8 | 30.1* | 1506 | 161 | 623 | 50 (128) | 3.5 | 89 | 48 |
| 35 | tetrabenzyl-hafnium | 3.9:0.3 | 200/2.9 | 70.0 | 32.4* | 2374 | 315 | 334 | 124 (131) | 7.3 | — | — |
| 36 | tetraneopentyl-zirconium | 5.0:0.3 | 299/1.42 | 67.0 | 18.8 | 2066 | 283 | 452 | 110 (127) | 7.0 | 84 | 35 |
| 37 | tetraneopentyl-hafnium | " | 300/2.68 | 76.5 | 24.6 | 1754 | 107 | 908 | 40 (133) | 2.4 | 98 | 44 |
| 38 | tetrakis (trimethyl-silylmethyl)-zirconium | " | 200/1.27 | 66.1 | 18.2 | 2079 | 265 | 417 | 70 (127) | 7.1 | 98 | 44 |

*0.025 w/v % concentration

EXAMPLE 39

This example illustrates the preparation of a composite using tetraneophylzirconium as the hydrocarbon soluble transition metal compound.

All operations up to the start of the polymerization were carried out under dry nitrogen. The polymerization apparatus was similar to that of Example 27. To a solution of 11 mmol of diisobutylaluminum hydride in 2.5 l of dry, deoxygenated cyclohexane was added 0.31 g of tetraneophylzirconium [tetrakis(2-methyl-2-phenylpropyl)zirconium]. After brief stirring the mixture was allowed to stand for one hour. The solution became orange during the first half hour; not much color change occurred thereafter. Five hundred grams

TABLE V

| | | | | | | | | | Product Properties | | | | |
|---|---|---|---|---|---|---|---|---|---|---|---|---|---|
| | | | | | | | | | | Impact Strength | | | |
| | | Mmol iBu$_3$Al: Mmol | Polymerization | % | Inh. | T, | E$_b$, | M$_i$, | Gardner, in lb | | 0° F. Izod, ft lb/in of | Micron-ization Homogeneity | Micron Homo. |
| Ex. | Catalyst | Catalyst | psi/hr | filler | Visc. | psi | psi | kpsi | 25° C.(mils) | −40° C. | notch | % | Index |
| 28 | tetrabenzyl-titanium | 7.5:0.2 | 100/1.12 | 64.0 | 19.2 | 2872 | 245 | 537 | 240 (125) | 160 | 2.9 | 84 | — |
| 29 | tetrabenzyl-hafnium | " | 100/0.59 | 64.9 | 19.0 | 2784 | 385 | 570 | 240 (129) | 160 | 3.2 | 83 | 63 |
| 30 | tetraneopentyl-zirconium | " | 100/0.40 | 62.6 | 19.4 | 2916 | 369 | 504 | 240 (125) | 115 | 2.1 | 85 | — |
| 31 | tetraneopentyl-hafnium | " | 100/0.75 | 65.5 | 17.9 | 2801 | 76 | 614 | 120 (125) | — | 3.1 | 85 | 68 |
| 32 | tetrakis(trimethyl-silylmethyl)-zirconium | 7.5:0.17 | 100/0.28 | 64.4 | 13.2 | 2970 | 240 | 589 | 240 (124) | 100 | 1.7 | 82 | 60 |
| 33 | tetrakis(dimethyl-amino)vanadium | 7.5:0.2 | 300/0.82 400/2.60 | 64.8 | 15.5 | 2842 | 181 | 774 | 234 (124) | — | 1.9 | 85 | — | of "GHA" 431 alumina trihydrate (Great Lakes Foundry Sand Co., weight-average equivalent spherical particle diameter 3.5μ), that had been dried over a weekend at 180° C. under a stream of nitrogen and cooled, was added, and the mixture was stirred for about five minutes to give a uniform suspension. The alumina trihydrate contained approximately 0.0005 milligram-atom of Zr per gram.

The suspension was transferred to an autoclave containing 0.63 gal of cyclohexane and processed with ethylene at 40° C. and 110 psi, with stirring at 450 rpm, until 200 g of ethylene had reacted (77 min). The autoclave was vented, the mixture was cooled, and the polyethylene/alumina trihydrate composite was separated by filtration, washed with cyclohexane, and air dried.

The product was a powder, 96% of which passed a 16-mesh screen. On ash analysis the product was found to have an alumina trihydrate content of 63.6%. The inherent viscosity of the polymer was 23.45. The composite had a 10-second micronization homogeneity of 98% and a micronization homogeneity index of 88. Compression molded test samples had the following physical properties:

| Tensile (T): | 3028, | 2906 psi |
|---|---|---|
| Elongation ($E_b$): | 440, | 405% |
| Modulus ($M_i$): | 383,000, | 473,000 psi |
| 0° F. Izod impact: | 6.9, | 7.6 ft lb/in of notch |
| Gardner impact: | 240 in lb | (128 mil) |
| 264-psi Heat deflection: | 67, | 77° C. |
| Flexural modulus: | 406,500, | 401,500 psi |

EXAMPLE 40

This example illustrates the preparation of a composite using tetraneophylchromium as the hydrocarbon-soluble transition metal compound.

A one-gallon autoclave was dried at 150° C. under nitrogen purge, cooled and charged with 0.3 gal of dried hexane and 1 ml of a 1.6 molar solution of triethylaluminum in hexane. Next was introduced under nitrogen purge a slurry prepared from 700 ml of dried heptane to which had been added, with stirring, in order: 115 g of "Satintone" No. 1 dehydrated kaolinite clay (Engelhard Mineral Co.) having a weight-average effective spherical particle diameter of 2 microns and a surface area of 8.2 m²/g, 0.007 mmol of tetraneophylchromium in hexane solution and 2 ml of a 1.6 molar solution of triethylaluminum in hexane. The autoclave was closed and the polymerization was carried out at 50° C. for 15.5 hr under 100 psi ethylene pressure.

The product, 188 g, was isolated on a filter as a fine, nearly white powder, and was found to contain 59.08% clay by ash analysis. The inherent viscosity of the polymer was 19.22. The composite had a 10-second micronization homogeneity of 90% and a micronization homogeneity index of 74. Specimens molded from the composite at 175° C. and 2000 psi pressure had the following properties:

| Tensile (T): | 3019 psi |
|---|---|
| Elongation ($E_b$): | 304% |
| Modulus ($M_i$): | 588,000 psi |
| 0° F. Izod impact: | 6.4 ft lb/in of notch |

EXAMPLE 41

This example illustrates the preparation of a composite using chromium octoate as the hydrocarbon-soluble transition metal compound.

A one-gallon autoclave was dried at 150° C. under nitrogen purge, cooled and charged with 0.3 gal of dried hexane and 1 ml of a 1.6 molar solution of triethylaluminum in hexane. Next was introduced under nitrogen purge a slurry prepared from 700 ml of heptane to which had been added in turn, with stirring, the following:

1 ml of a 0.01 molar solution of chromium octoate in heptane; 146 g of "Satintone" No. 1 kaolinite clay (Example 15), dried at 190° C.; a second 1 ml of the 0.01 molar solution of chromium octoate in heptane; and 1.5 ml of a 1.6 molar solution of triethylaluminum in hexane. The autoclave was closed and the polymerization was carried out at 50° C. for 7.3 hours under 100 psi ethylene pressure.

The product, 285.3 g, was isolated on a filter as a mostly fine, nearly white powder. It contained 49.35% clay by ash analysis. The inherent viscosity of the polymer was 24.28. The composite had a 10-second micronization homogeneity of 89% and a micronization homogeneity index of 68. Specimens molded from this composite at 175° C. and 2000 psi pressure had the following physical properties:

| Tensile (T): | 2809 psi |
|---|---|
| Elongation ($E_b$): | 358% |
| Modulus ($M_i$): | 371,000 psi |
| 0° F. Izod impact: | 8.5 ft lb/in of notch |

EXAMPLE 42

"LU330" Feldspar (Lawson-United Products, mean particle size 5μ, surface area 1.4–1.5 m²/g) was coated with $Al_2O_3$ by adding a solution of 24 g of $AlCl_3.6H_2O$ in 400 ml of water to a suspension of 500 g of the mineral in 2 l of water. After stirring 30 minutes, the mixture was neutralized with 5% aqueous ammonia followed by an additional hour of stirring. The product was collected by filtration, and washed with distilled water until the filtrate was neutral. The alumina-coated feldspar was dried at 200° C. for 18 hours under the purge.

A suspension was prepared by adding 60 g of the above feldspar to 600 ml of deoxygenated, dry cyclohexane containing 4 mmol of triisobutylaluminum and 0.2 mmol of tetrabenzylzirconium (0.003 milligram-atom of Zr per gram of feldspar). This suspension was transferred to a 1-liter stirred autoclave. The polymerization was carried out at 50° C. under an ethylene pressure of 100 psi for 5 minutes at which time 25 g of ethylene had been consumed.

The resulting composite had an ash content by combustion of 61.44%. The polymer had an inherent viscosity of 22.09. Compression molded bars had the following properties:

| Tensile (T): | 2946, | 2600 psi |
|---|---|---|
| Elongation ($E_b$): | 431, | 357% |
| Modulus ($M_i$): | 583,000, | 565,000 psi |
| 0° F. Izod impact: | 10.1, | 9.9 ft lb/in of notch |

EXAMPLE 43

A 1200-g portion of $BaSO_4$ powder in 2500 ml of water was coated with $Al_2O_3$ as described for $CaCO_3$ in Example 27.

After adding a solution of 57 g of $AlCl_3.6H_2O$ in 400 ml of water, the mixture was neutralized with dropwise addition of 5% aqueous ammonia. The solid was collected by filtration and washed with distilled water. One-half of the moist product was resuspended in 1500 ml of water and treated with a solution of $TiOCl_2$ made by adding 9 ml of $TiCl_4$ dropwise to 200 g of ice. The resulting mixture was neutralized by the dropwise addition of 5% aqueous ammonia. The solid was collected by filtration and washed with water. Based on the amounts of materials used, the $BaSO_4$ contained 1.0% $Al_2O_3$ and 1.08% $TiO_2$ (0.14 milligram-atom of Ti per gram of $BaSO_4$) at the surface. The $BaSO_4$ was dried at 300° C. for 18 hrs under a nitrogen flow of 30 l/hr before use.

The reaction mixture was prepared in a blender cup from 600 ml of deoxygenated, dry cyclohexane, 100 g of the above coated $BaSO_4$, and 5 mmol of triisobutylaluminum. The polymerization was carried out in a 1-liter stirred autoclave at 70° C. under an ethylene pressure of 100 psi for 14 minutes during which time 18 g of ethylene was consumed.

The product (117 g of powder) had an ash content of 80.21%. Compression molded test bars had the following properties:

| | | |
|---|---|---|
| Tensile (T): | 2366, | 2304 psi |
| Elongation ($E_b$): | 177, | 211% |
| Modulus ($M_i$): | 745,000, | 694,000 psi |
| 0° F. Izod impact: | 4.4, | 4.3 ft lb/in of notch |

EXAMPLE 44

This example illustrates the preparation of a composite using tetramethyl titanate in the polymerization reaction.

The following operations were all carried out in a nitrogen atmosphere. To 2.1 of cyclohexane in a 5-liter glass pot fitted with a Waring Blender was added 5.1 mmol of $(C_2H_5)_3Al$ as a 1.6 molar solution in heptane, followed by 200 g of "Alcoa" C-30BF $Al_2O_3.3H_2O$ (Example 13) heated at 152° C. for 16 hr in a nitrogen stream and cooled in nitrogen. This mixture was stirred vigorously for 1 minute. There was then added 0.3 mmol of $Ti(OCH_3)_4$ as a solid, followed by vigorous stirring for 8 minutes. The alumina trihydrate contained approximately 0.0015 milligram-atom of Ti per gram.

The resulting suspension was transferred to a 1-gal steel autoclave under nitrogen pressure; the stirrer in the autoclave was rotated at 1,000 rpm during the transfer and during the resulting polymerization. The polymerization was carried out at 250 psi ethylene pressure for 3.25 hrs. The autoclave was then vented and cooled, and the solids filtered and air-dried. The total weight of the product recovered was 287.9 g; 156 g of this passed through a 20-mesh screen and 52.3 g only through a 14-mesh screen.

The material passing through the 20-mesh screen was found by ash analysis to contain 67.8% $Al_2O_3.3H_2O$. The polymer had an inherent viscosity of 16.25. The product was pressed at 180° C. and 2000 psi into a 129–130 mil plaque. Test bars cut from this plaque had the following properties:

| | |
|---|---|
| Tensile (T): | 2069 psi |
| Elongation ($E_b$): | 313% |
| Modulus ($M_i$): | 474,000 psi |
| 0° F. Izod impact: | 9.0 ft lb/in of notch |
| 25° C. Gardner impact: | 115 in/lb |

EXAMPLE 45

This example illustrates the use of a mixture of fuller's earth and titanium dioxide as the filler.

The reaction mixture was prepared by adding 60 g of a 90% fuller's earth:10% "Ti-Pure" R-101 rutile (Example 7) mixture, which had been dried by heating for 13 hours at 300° C. under a 30-liter/hr nitrogen flow, to 600 ml of dry and oxygen-free cyclohexane containing 4 mmol (0.8 g) of triisobutylaluminum and 0.2 mmol of tetrabenzylzirconium in 2 ml of toluene in an enclosed blender cup under nitrogen purge. After stirring, the mixture was transferred to a dry and oxygen-free, 1-liter autoclave. The polymerization was carried out at 50° C. under 100 psi of ethylene in 19 minutes. There resulted 97 g of composite powder that passed a 20 mesh sieve.

When the composite was pyrolyzed in air, it had an ash content of 46.94%. The polymer had an inherent viscosity of 14.98 (0.025 w/v %). The 10-second micronization homogeneity was 99%, and the micronization homogeneity index was 77.

Test bars were prepared by heating the composite at 180° C. for 1 min, followed by compression at 3000 psi for 3 min at 180° C. These bars had the following properties:

| | | |
|---|---|---|
| Tensile (T): | 3645, | 3499 psi |
| Elongation ($E_b$): | 43, | 29% |
| Modulus ($M_i$): | 483,000, | 451,000 psi |
| 0° F. Izod Impact: | 2.4, | 2.2 ft lb/in of notch |

EXAMPLE 46

This example illustrates the use of a titania coated mixture of kaolinite clay and alumina trihydrate as the filler.

A 60-g portion of tetraisopropyl titanate was added to a stirred suspension of 150 g of uncalcined "Harwick" GK kaolinite clay (Example 1) and 150 g of "Alcoa" C-30BF $Al_2O_3.3H_2O$ (Example 13) in 400 ml of cyclohexane, and the viscosity dropped to that of the solvent. The mixture was milled with glass rods for 1 day. The solid was collected by filtration, washed with cyclohexane, exposed to air, and dried by heating for 18 hours at 170° C. under a 30-liter per hour flow of nitrogen.

The reaction mixture was prepared by adding 70 g of the above freshly prepared titania coated 1:1 "Harwick" GK kaolinite clay:"Alcoa" C-30BF mixture to 600 ml of dry and oxygen-free cyclohexane containing 4 mmol (0.8 g) of triisobutylaluminum in an enclosed blender cup under nitrogen purge. After stirring, the mixture was transferred to a dry and oxygen-free, 1-liter autoclave. The polymerization was carried out at 60° C. under 100 psi of ethylene for 1 hour and 11 minutes. The product was 89 g of composite powder that passed a 20 mesh sieve.

The composite was found by ash analysis to contain 67.5% mineral. The polymer had an inherent viscosity of 27.47 (0.025 w/v %). The 10-second micronization homogeneity was 86% and the micronization homogeneity index was 68.

Test bars which were prepared by heating the composite in a mold at 180° C. for 1 minute and then compressing at 3000 psi at 180° C. for 3 minutes had the following properties:

| Tensile (T): | 3025, | 2826 psi |
|---|---|---|
| Elongation ($E_b$): | 301% | |
| Modulus ($M_i$): | 955,000 psi | |
| 0° F. Izod Impact: | 8.1, | 8.3 ft lb/in of notch |

EXAMPLE 47

This example illustrates the use of bentonite clay with a hydrocarbon-soluble organic transition metal catalyst. The reaction mixture was prepared by adding 70 g of bentonite (Fisher Scientific), which had been dried by heating for 18 hours at 300° C. under a 30-liter/hr nitrogen flow, to 600 ml of clay and oxygen-free cyclohexane containing 4 mmol (0.8 g) of triisobutylaluminum and 0.2 mmol of tetrabenzylzirconium, 2 ml of toluene in an enclosed blender cup with nitrogen purge. After stirring, the mixture was transferred to a dry and oxygen-free, 1-liter autoclave. The polymerization was carried out at 50° C. under 100 psi of ethylene in 9 minutes. There resulted 115 g of composite powder that passed a 20-mesh sieve.

When the composite was pyrolyzed in air, it had an ash content of 52.65%. The polymer had an inherent viscosity of 11.26 (0.025 w/v %). The 10-second micronization homogeneity was 79% and the micronization homogeneity index was 66.

Test bars were prepared by heating the composite at 180° C. for 1 minute, followed by compression at 3000 psi for 3 minutes at 180° C. The test bars had the following properties:

| Tensile (T): | 3214, | 3202 psi |
|---|---|---|
| Elongation ($E_b$): | 32, | 19% |
| Modulus ($M_i$): | 495,000, | 399,000 psi |
| 0° F. Izod Impact: | 1.2; | 1.2 ft lb/in of notch |

EXAMPLE 48

This example illustrates the use of tricalcium phosphate as the filler.

The reaction mixture was prepared by adding 60 g of $Ca_3(PO_4)_2$ (J. T. Baker Co.), which had been dried by heating for 13 hours at 300° C. under a 30-liter/hr nitrogen flow, to 600 ml of dry and oxygen-free cyclohexane containing 4 mmol (0.8 g) of triisobutylaluminum and 0.2 mmol of tetrabenzylzirconium in 2 ml of toluene in an enclosed blender cup under nitrogen purge. After stirring, the mixture was transferred to a dry and oxygen-free autoclave. The polymerization was carried out at 50° C. under 100 psi of ethylene in 18 minutes. There resulted 100 g of composite powder that passed a 28-mesh sieve.

When the composite was pyrolyzed in air, it had an ash content of 48.95%. The polymer had an inherent viscosity of 8.49 (0.025 w/v %). The 10-second micronization homogeneity was 74% and the micronization homogeneity index was 41.

Test bars were prepared by heating the composite at 180° C. for 1 minute, followed by compression at 3000 psi for 3 minutes at 180° C. The bars had the following properties:

| Tensile (T): | 3128, | 3133 psi |
|---|---|---|
| Elongation ($E_b$): | 28, | 16% |
| Modulus ($M_i$): | 555,000, | 599,000 psi |
| 0° F. Izod Impact: | 1.8, | 2.0 ft lb/in of notch |

EXAMPLE 49

This example illustrates the preparation of a composite from calcium carbonate coated with silica.

A solution of monomeric silicic acid was prepared by adding 28 g of silicon tetrachloride to 200 g of ice with strong stirring in a blender. The resulting clear solution was added immediately, dropwise with stirring, to a suspension of 1000 g of "Gamma Sperse" 80 calcium carbonate (Example 27) in 2 liters of water. The mixture was filtered, and the solid on the filter was washed free of chloride ion with water, dried, and pulverized. It was further dried for 18 hours at 300° C. under a stream of nitrogen flowing at 30 l/hr.

The reaction mixture was prepared by adding 70 g of the above $SiO_2$ coated $CaCO_3$ to 600 ml of dry and oxygen-free cyclohexane containing 4 mmol (0.8 g) of triisobutylaluminum and 0.2 mmol of tetrabenzylzirconium in 2 ml of toluene in an enclosed blender cup under nitrogen purge. After stirring, the mixture was transferred to a dry and oxygen-free autoclave. The polymerization was carried out at 50° C. under 100 psi of ethylene in 21 minutes. There resulted 95 g of composite powder that passed a 16-mesh sieve.

The composite was found by ash analysis to contain 72.2% $CaCO_3$. The polymer had an inherent viscosity of 25.02 (0.025 w/v %). The 10-second micronization homogeneity was 98% and the micronization homogeneity index was 85.

Test bars were prepared by heating the composite at 180° C. for 1 minute, followed by compression at 3000 psi for 3 minutes at 180° C. These bars had the following properties:

| Tensile (T): | 2716, | 2663 psi |
|---|---|---|
| Elongation ($E_b$): | 279, | 270% |
| Modulus ($M_i$): | 889,000, | 748,000 psi |
| 0° F. Izod Impact: | 6.2, | 7.1 ft lb/in of notch |

EXAMPLE 50

This example illustrates the preparation of a composite from calcium carbonate coated with acid phosphate.

A solution of 45 g of 85% phosphoric acid in 200 ml of water was added dropwise with stirring to a suspension of 600 g of "Gamma Sperse" 80 calcium carbonate (Example 27). The suspension was filtered, and the solid on the filter was washed with water and dried. The solid was further dried at 250° C. for 18 hours in a 30-liter/hr stream of nitrogen. The reaction mixture was prepared by adding 70 g of $H_3PO_4$ treated $CaCO_3$ to 600 ml of dry and oxygen-free cyclohexane containing 4 mmol (0.8 g) of triisobutylaluminum and 0.2 mmol of tetrabenzylzirconium in 2 ml of toluene in an enclosed blender cup under nitrogen purge. After stirring, the mixture was transferred to a dry and oxygen-free autoclave. The polymerization was carried out at 50° C. under 100 psi of ethylene in 9 minutes. There resulted 97 g of composite powder that passed a 16-mesh sieve.

The composite was found by ash analysis to contain 71% $CaCO_3$. The polymer had an inherent viscosity of 24.96 (0.025 w/v %). The 10-second micronization homogeneity was 98% and the micronization homogeneity index was 81.

Test bars were prepared by heating the composite at 180° C. for 1 min, followed by compression at 3000 psi for 3 min at 180° C. These bars had the following properties:

| Tensile (T): | 2692, | 2637 psi |
|---|---|---|
| Elongation ($E_b$): | 244, | 255% |
| Modulus ($M_i$): | 573,000, | 600,000 psi |
| 0° F. Izod Impact: | 8.2, | 11.0 ft lb/in of notch |

EXAMPLE 51

This example illustrates the use of alumina coated $CaF_2$ as the filler.

The $CaF_2$ was coated with $Al_2O_3$ by suspending 390 g of $CaF_2$ in approximately 1500 cc of distilled water and adding dropwise a solution of 25 g of $AlCl_3.6H_2O$ in 400 ml of water while stirring. The mixture was neutralized with 5% aqueous ammonia which at the same time precipitated $Al_2O_3$. The mixture was stirred for one hour and the solid was collected by filtration and washed with distilled water. The solid was dried at 150° C. for 18 hours under a 30-liter/hr flow of nitrogen.

Analysis: Al 1.18%, 1.25%.

The polymerization was carried out in a dry and oxygen-free, 1-liter autoclave. The reaction mixture was prepared by adding 80 g of the above $Al_2O_3$ coated $CaF_2$ to 600 ml of dry and oxygen-free cyclohexane containing 4 mmol (0.8 g) of triisobutylaluminum and 0.2 mmol of tetrabenzylzirconium. The vigorously stirred mixture was transferred to the autoclave. The polymerization was carried out at 50° C. under 100 psi of ethylene for 8 minutes. The product was 82 g of composite which passed through a 16-mesh sieve and 27 g of larger particles which were discarded.

When the composite was pyrolyzed in air, it had an ash content of 55.85%. The 10-second micronization homogeneity was 72% and the micronization homogeneity index was 52. Test bars, prepared by molding at 180° C. for 1 minute followed by compression at 3000 psi for 3 minutes, had the following properties:

| Tensile (T): | 3294, | 3314 psi |
|---|---|---|
| Modulus ($M_i$): | 407,000, | 464,000 psi |
| Elongation ($E_b$): | 221, | 216% |
| 0° F. Izod Impact: | 13.8, | 12.4 ft lb/in of notch |

EXAMPLE 52

This example illustrates the use of dawsonite as the filler.

(A) To a stirred suspension of 500 g of ground dawsonite ("Alcoa", Lot No. P1746-3) in 2 lb of ether was added dropwise over 1 hour a solution of 10 g of 85% phosphoric acid in 300 ml of ether. After being stirred for 3 hours more, the mixture was filtered under nitrogen pressure, and the solid on the filter was dried in a stream of nitrogen. The acid-phosphate-coated dawsonite thus obtained weighed 493 g.

Analysis: P 1.01%, 0.98%.

(B) Dry, deoxygenated cyclohexane (600 ml) was passed through a bed of Woelm acid alumina into an enclosed blender cup under nitrogen. There were then added 0.3 mmol of triisobutylaluminum, a solution of 0.3 mmol of tetrabenzylzirconium in 3 ml of toluene, and 60 g of the phosphoric acid-treated dawsonite of part (A), which had been dried further at 125° C. for 18 hours in a stream of nitrogen at 30 l/hr. The resulting dispersion was transferred through polyethylene tubing under nitrogen pressure to a 1-liter stainless-steel autoclave equipped with a stirrer. The autoclave had previously been dried by heating at 150° C. under 0.5 mm vacuum for 2 hours, purging with nitrogen at 150° C. for 3 hours, and cooling under nitrogen. Stirring was started, the system was heated to 50° C., the autoclave was pressured with ethylene to 60 psi, and the mixture was heated at 50° C. and 60 psi, with repressuring as necessary, until 40 g of ethylene had been consumed in addition to that required for the initial pressuring (3 hr). The autoclave was cooled and vented, and the solid product was separated by filtration and dried. The recovered product consisted of 77 g of powder that passed through a 28-mesh screen and 16 g of larger particles. The powder gave 36.40% ash on combustion, corresponding to a 36/64 polyethylene/dawsonite composition. The inherent viscosity of the polymer was 20.11 determined using a 0.025 w/v % solution. The composite had a 10-second micronization homogeneity of 96% and a micronization homogeneity index of 82.

The powder was compression molded to a plaque by heating in a mold at 185° C. for 3 minutes, followed by heating at 185° C. and 3000 psi for 2 minutes. Test bars cut from the plaque had the following properties:

| Tensile (T): | 2748, | 2686 psi |
|---|---|---|
| Elongation ($E_b$): | 26%, | 4.7% |
| Modulus ($M_i$): | 647, | 592 kpsi |
| 0° F. Izod impact: | 5.2, | 4.3 ft lb/in of notch (hinge break) |
| 264-psi Heat Deflection: | 71.5° C., | 77.5° C. |

EXAMPLE 53

This example shows that composites containing dawsonite as filler have some flame-retardant properties.

Example 52 was repeated, with the following changes: The phosphoric acid-treated dawsonite was air-micronized before the final drying, to minimize the presence of aggregates, and the polymerization was carried out at 100 psi until 38 g of ethylene had been consumed (1 hr, 54 min). The product was 89 g of a powder that passed through a 16-mesh screen. It gave 33.66% ash on combustion, corresponding to a polyethylene/dawsonite composition of 40.8/59.2.

Bars cut from a plaque compression molded at 180° C. and 3000 psi had the following properties:

| Tensile (T): | 2562, | 2568 psi |
|---|---|---|
| Elongation ($E_b$): | 386%, | 103% |
| Modulus ($M_i$): | 454, | 472 kpsi |
| 0° F. Izod impact: | 7.5, | 6.2 ft lb/in of notch (partial break) |

-continued

| | |
|---|---|
| Oxygen index: | 0.269 |

EXAMPLE 54

This example illustrates the use of a mixture of alumina trihydrate and dawsonite as the filler.

(A) A mixture of 200 g of "GHA" 431 alumina trihydrate (Example 39), 50 g of the acid-phosphate treated dawsonite described in Example 52(A), 3 ml of tetraisopropyl titanate, and 500 ml of cyclohexane was rodmilled for 5 hours. The product was separated by filtration, washed with cyclohexane, and dried under nitrogen. It was then airmicronized.

(B) By essentially the procedure of Example 52(B)$_3$, a dispersion containing 55 g of the 4/1 alumina trihydrate/dawsonite prepared in part (A) above which had been dried further at 170° C. for 18 hours in a stream of nitrogen at 30 l/hr, 4 mmol of triisobutylaluminum, 0.2 mmol of tetrabenzylzirconium, and 600 ml of cyclohexane was processed with ethylene at 50° C. and 100 psi until 43 g of ethylene had been consumed (3 hr, 17 min). The recovered product was 91 g of a powder that passed through a 16-mesh screen. It gave 38.71% ash on combustion, corresponding to a polyethylene/mineral composition of 39.2/60.8, the mineral being 4/1 alumina trihydrate/dawsonite. The composite had a 10-second micronization homogeneity of 96% and a micronization homogeneity index of 87.

Test bars cut from a plaque compression molded at 180° C. and 3000 psi had the following properties:

| | | |
|---|---|---|
| Tensile (T): | 2233, | 2298 psi |
| Elongation (E$_b$): | 353%, | 298% |
| Modulus (M$_i$): | 396, | 405 kpsi |
| 0° F. Izod impact: | 13.3, | 13.5 ft lb/in of notch (partial break) |
| Oxygen index: | 0.276 | |

EXAMPLE 55

This example illustrates an injection moldable composite containing kaolinite clay.

Up to the start of the polymerization and during addition of antioxidant to the product, all operations were carried out under nitrogen.

(A) Cyclohexane (2.5 l) was sparged with nitrogen and passed through Woelm acid alumina into a blender equipped with a high-speed stirrer. Triisobutylaluminum (12.2 mmol) was added, followed by 0.53 mmol of tetrabenzylzirconium as a 5% solution in toluene. The resulting solution was allowed to stand for about 0.5 minute. A 500-g portion of "Harwick" GK soft kaolinite clay (Example 1) that had been dried at 150° C. for 24 hours was then added. The mixture was stirred at high speed for one minute. The resulting slurry was transferred through polyethylene tubing under nitrogen pressure to a 5-gal stainless-steel autoclave containing 3 gal of dry, deoxygenated hexane. Before the hexane was charged, the autoclave had been heated at 150° C. and 0.5 mm vacuum for two hours, purged with nitrogen at 150° C. for three hours, and cooled under nitrogen. Stirring at 500 rpm was started, the mixture was heated to 50° C., and the system was pressured with hydrogen to 500 psi. Ethylene was admitted to the system at 100 psi, and the polymerization was continued, with repressuring of ethylene as necessary, until 850 g of ethylene had been consumed (46.82 min). The autoclave was cooled, excess pressure was bled down, a solution of 0.085 g (0.01% of the expected amount of polyethylene) of "Irganox" 1010 antioxidant in toluene was stirred in, and the product was separated by filtration and dried.

The finely powdered composite gave 29.38% ash on combustion, corresponding to a polyethylene/clay composition of 65.8/34.2. The inherent viscosity of the polymer was 2.54.

Hot-compression molded test bars had the following properties:

| | |
|---|---|
| Tensile (T): | 2750 psi |
| Elongation (E$_b$): | 77% |
| Modulus (M$_i$): | 309 kpsi |
| 0° F. Izod impact: | 1.2 ft lb/in of notch |
| 73° F. Izod impact: | 2.6 ft lb/in of notch |
| Flexural modulus: | 264 kpsi |

In addition, tensile bars, plaques, and combs were made by injection molding in a Newberry ram-injection molder (Model HI-30-T). The composite was heated in the injector at 230° C. for about 20 seconds, then ram injected at 6,000 psi for 20 seconds into the mold, which was heated at 100° C., and cooled in the mold for 20 seconds.

(B) For the formation of molded objects by screw-injection molding, a blend was prepared by combining the product of part (A) above with the products of four other runs. These runs were carried out by the general method described in part (A) above, with some variation in the amounts of clay, ethylene, triisobutylaluminum, and tetrabenzylzirconium. Their clay contents ranged from 31.7% to 40.4%, and the inherent viscosities of the polymers ranged from 2.54 to 5.15. The clay content of the overall blend was 35.3%, and the inherent viscosity of the polyethylene was 3.92.

The blend was injection molded to 4-oz tumblers and 2⅝ in diameter Michigan gears in a 6-oz Van Dorn screw-injection molder. The blended composite was heated and melted at 400° F. and injected at 16,000 psi through a nozzle heated at 450° F. into a mold heated at 165°–170° F. The total cycle was 23 seconds, with a 10-second heating, a 5-second injection, and an 8-second hold.

(C) A sample was prepared by the method of part (A) above, except that 13.0 mmol of triisobutylaluminum and 0.56 mmol of tetrabenzylzirconium were used, the clay had been dried at 170° C. for 20 hours, stirring was at 400 rpm, the reaction temperature was 54° C., and 930 g of ethylene was consumed (38.35 min). The solid product gave 26.7% ash on combustion, corresponding to a polyethylene/clay composition of 69.0/31.0. The inherent viscosity of the polymer was 3.96. The composite had a 10-second micronization homogeneity of 64% and a micronization homogeneity index of 37. Only 3.33 g of the composite was available for use in this determination.

Hot-compression molded test bars had the following properties:

| | |
|---|---|
| Tensile (T): | 3027 psi |
| Elongation (E$_b$): | 399% |
| Modulus (M$_i$): | 300 kpsi |
| 0° F. Izod impact: | 1.4 ft lb/in of notch |
| 73° F. Izod impact: | 4.2 ft lb/in of notch |
| Flexural modulus: | 301 kpsi |

(D) A blend of two samples prepared in two different runs by essentially the method of part (C) above except that in each run stirring was at 450 rpm, the polymerization temperature was 53° C., and 100 g of ethylene was consumed (37.88 min, 42.24 min). The blend of the two runs gave 28.2% ash on combustion, corresponding to an overall polyethylene/clay composition of 67.2/32.8. The inherent viscosity of the polymer was 3.13. The composite had a 10-second micronization homogeneity of 64% and a micronization homogeneity index of 40.

Hot-compression molded test bars had the following properties:

| Tensile (T): | 3086 psi |
|---|---|
| Elongation ($E_b$): | 436% |
| Modulus ($M_i$): | 331 kpsi |
| 0° F. Izod impact: | 0.98 ft lb/in of notch |
| 73° F. Izod impact: | 2.22 ft lb/in of notch |
| Flexural modulus: | 297 kpsi |

EXAMPLE 56

This example illustrates an injection moldable composite containing titanium dioxide pigment.

(A) By essentially the method of Example 55 (A), 600 g of "Ti-Pure" R 101 rutile (Example 7) that had been dried at 400° C. for 24 hours in a stream of nitrogen at 30-40 l/hr, 8.0 mmol of triisobutylaluminum, and 0.40 mmol of tetrabenzylzirconium were processed with hydrogen at 600 psi and ethylene at 35 psi at 44°-51° C. until 800 g of ethylene had been consumed (40.85 min). The solid product thus produced gave 45.82% ash on combustion, corresponding to a polyethylene/titania composition of 54.2/45.8. The inherent viscosity of the polymer was 4.13.

Test bars made by hot-compression molding had the following properties:

| Tensile (T): | 3047 psi |
|---|---|
| Elongation ($E_b$): | 188% |
| Modulus ($M_i$): | 442 kpsi |
| 0° F. Izod impact: | 2.4 ft lb/in of notch |
| 264-psi Heat Deflection: | 57° C. |
| Flexural Modulus: | 309 kpsi |

Test bars, plaques, and combs were prepared by ram-injection molding. Tumblers and gears were made by screw-injection molding.

(B) Homogeneity determinations were run on a sample prepared by the method of Part (A) above, except that 700 g of titanium dioxide was used and the polymerization was carried out at 30 psi ethylene pressure and 40°-47° C. until 850 g of ethylene had been consumed (60.02 min). The solid product gave 46.49% ash on combustion, corresponding to a polyethylene/titania composition of 53.5/46.5. The inherent viscosity of the polymer was 4.04. The composite had a 10-second micronization homogeneity of 75% and a micronization homogeneity index of 57.

Test bars made by hot-compression molding had the following properties:

| Tensile (T): | 3200 psi |
|---|---|
| Elongation ($E_b$): | 7.2% |
| Modulus ($M_i$): | 465 kpsi |
| 0° F. Izod impact: | 1.14 ft lb/in of notch |
| 264-psi Heat Deflection: | 55.5° C. |
| Flexural Modulus: | 308 kpsi |

I claim:

1. A solid, homogeneous, particulate, highly-filled, polyolefin composite which comprises
   (a) 10-75% by weight of polyolefin having an inherent viscosity of at least 2 selected from the group consisting of polyethylene and copolymers of ethylene containing up to 15% by weight of units derived from one or more 1-alkenes of 3 to 10 carbon atoms, and
   (b) 25-90% by weight of finely-divided, inorganic filler compound having a neutral-to-acidic surface and a weight-average average equivalent spherical particle diameter of 0.1 to less than 50μ, and having interacted at its surface sufficient catalytically-active transition metal compound which contains substantially no halogen bonded to the transition metal to provide 0.000001-1.7 milligram-atom of transition metal per gram of filler, said polyolefin being polymerized onto the surface of said filler, and said composite being substantially free of polymer-free filler and filler-free polymer, being a free-flowing powder, having particle sizes in the range of 0.1μ to 5 mm, and having a 10-second micronization homogeneity of at least 50% and a micronization homogeneity index of at least 20.

2. The composite of claim 1 which contains 10-70% polyolefin having an inherent viscosity of at least 4, and 30-90% inorganic filler compound.

3. The composite of claim 2 in which the polyolefin is polyethylene.

4. The composite of claim 3 which contains 15-60% polyethylene having an inherent viscosity of at least 8, and 40-85% inorganic filler compound having a particle diameter of less than 45μ, a surface area of 0.01-100 m²/g, and 0.0001-0.8 milligram-atom of transition metal interacted at its surface.

5. The composite of claim 4 which contains 20-55% polyethylene having an inherent viscosity of at least 12, and 45-80% inorganic filler compound having a particle diameter of 1-25μ and a surface area of 0.5-50 m²/g, and in which the 10-second micronization homogeneity is at least 70%, and the micronization homogeneity index is at least 50.

6. The composite of claim 5 in which the inorganic filler compound is coated with an acidic oxide to provide an acidic surface.

7. The composite of claim 5 in which the inorganic filler compound is selected from the group consisting of alumina hydrates, silicas, water-insoluble silicates, calcium carbonate and basic aluminum sodium carbonates, and the transition metal is selected from the group consisting of titantium, zirconium and chromium.

8. The composite of claim 1 which is injection moldable and contains 30-75% by weight of polyolefin having an inherent viscosity of 2-6, and 25-70% by weight of inorganic filler compound having 0.000001-0.1 milligram-atom of transition metal, per gram of filler, interacted at its surface.

9. The composite of claim 8 in which the polyolefin is polyethylene.

10. The composite of claim 9 in which the inorganic filler compound has a particle diameter of 1-25μ, a surface area of 0.01-100 m²/g, and 0.00001-0.01 milligram-atom of transition metal selected from the group consisting of titanium, zirconium and chromium, per gram of filler, interacted at its surface.

11. The composite of claim 10 which contains 50–70% polyethylene having an inherent viscosity of 3 to 5, and 30–50% inorganic filler compound having a surface area of 0.5–50 m$^2$/g.

12. The composite of claim 11 in which the inorganic filler compound is coated with an acidic oxide to provide an acidic surface.

13. The composite of claim 11 in which the inorganic filler compound is selected from the group consisting of silicas, water-insoluble silicates, calcium carbonate and basic aluminum sodium carbonates, the 10-second micronization homogeneity is at least 70%, and the micronization homogeneity index is at least 50.

14. The composite of claim 1 which is flame retardant in which the polyolefin is polyethylene and at least 50% by weight of the composite is inorganic filler compound selected from the group consisting of alumina hydrates and basic aluminum sodium carbonates.

15. The flame retardant composite of claim 14 in which at least 50% by weight of the composite is dawsonite.

16. The method of preparing a solid, homogeneous, particulate, highly-filled polyolefin composite which comprises
(A) dehydrating finely-divided aluminum silicate clay selected from the group consisting of kaolinite, attapulgite and fuller's earth, and containing at least 0.05% by weight of titania, said clay having a weight-average equivalent spherical particle diameter of less than 50μ, and being free of promotion with added transition metal coordination catalyst component, by heating at a temperature of 400°–1400° C. to reduce the water content to less than one mole of water per mole of aluminum silicate clay;
(B) dispersing
(1) at least 1 weight/volume percent of finely-divided, inorganic filler compound, said filler being
(a) 70–100% by weight of said dehydrated aluminum silicate clay, and
(b) 0–30% by weight of pigmentary oxide selected from the group consisting of titania, zinc oxide, antimony trioxide and mixtures thereof, said pigmentary oxide having a weight-average equivalent spherical particle diameter less than that of the clay, and
(2) 0.001–1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1–10 carbons each, in an inert, liquid hydrocarbon diluent;
(C) contacting the resulting dispersion with olefin selected from the group consisting of ethylene and mixtures of ethylene with one or more 1-alkenes of 3 to 10 carbons with agitation at a temperature of 0°–250° C. and a pressure from atmospheric to 500 atmospheres until a composite containing 10–70% by weight, based on the polyolefin and filler, of polyolefin selected from the group consisting of polyethylene and copolymers of ethylene containing up to 15% by weight of units derived from one or more 1-alkenes of 3 to 10 carbons having an inherent viscosity of at least 4 is formed; and
(D) isolating the resulting polyolefin/filler composite as a free-flowing powder.

17. The method of claim 16 in which the olefin is ethylene.

18. The method of claim 17 in which the aluminum silicate clay has a weight-average equivalent spherical particle diameter of less than 45μ and a titania content of 1.68–2.05% by weight based on calcined clay, the dispersion contains 0.01–2% by weight, based on the filler, of organoaluminum compound selected from the group consisting of trialkylaluminums, dialkylaluminum hydrides, dialkylaluminum alkoxides and alkylaluminum halides, and the dispersion is contacted with olefin until a composite containing 20 to 70% polyolefin is formed.

19. The method of claim 17 in which the aluminum silicate clay has a surface area of 0.01 to less than 100 m$^2$/g, the pigmentary oxide has a weight-average equivalent spherical particle diameter which is not more than half that of the aluminum silicate clay, and the dispersion is contacted with ethylene until a composite containing 15–60% by weight of polyethylene having an inherent viscosity of at least 8 is formed.

20. The method of claim 19 in which the aluminum silicate clay contains at least 0.5% by weight of titania, has a surface area of 0.5–50 m$^2$/g and a weight-average equivalent spherical particle diameter of 1–25μ, the dispersion contains 0.002–0.2 millimole of organoaluminum compound per gram of filler, and the dispersion is contacted with ethylene until a composite containing 20–55% by weight of polyethylene having an inherent viscosity of at least 12 is formed.

21. The method of preparing a solid, homogeneous, particulate, highly-filled, polyolefin composite which comprises
(A) contacting a finely-divided, inorganic filler compound having a neutral-to-acidic surface and a weight-average equivalent spherical particle diameter of less than 50μ with sufficient hydrolyzable titanium compound to provide 0.000001–1.7 milligram-atom, per gram of filler, of titanium interacted at the surface of the filler;
(B) removing unadsorbed titanium compound from the filler;
(C) hydrolyzing the adsorbed titanium compound;
(D) activating the titanium-treated filler by heating at a temperature of at least 100° C. to form a titania-modified filler;
(E) dispersing
(1) at least 1 weight/volume percent of finely-divided, inorganic filler compound, said filler being
(a) 70–100% by weight of said titania-modified filler, and
(b) 0–30% by weight of pigmentary oxide which is not titania-modified, said pigmentary oxide being selected from the group consisting of titania, zinc oxide, antimony trioxide and mixtures thereof and having a weight-average equivalent spherical particle diameter less than that of said titania-modified filler; and
(2) 0.0001–1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1-10 carbons each, in an inert, liquid hydrocarbon diluent;

(F) contacting the resulting dispersion with olefin selected from the group consisting of ethylene and mixtures of ethylene with one or more 1-alkenes of 3 to 10 carbons with agitation at a temperature of 0°-250° C. and a pressure from atmospheric to 500 atmospheres until a composite containing 10-70% by weight, based on the polyolefin and filler, of polyolefin selected from the group consisting of polyethylene and copolymers of ethylene containing up to 15% by weight of units derived from one or more 1-alkenes of 3 to 10 carbons having an inherent viscosity of at least 4 is formed; and (G) isolating the resulting polyolefin/filler composite as a free-flowing powder.

22. The method of claim 21 in which the olefin is ethylene.

23. The method of claim 22 in which the inorganic filler compound is aluminum silicate clay selected from the group consisting of kaolinite, attapulgite, fuller's earth and bentonite, and has a weight-average equivalent spherical particle diameter of less than $5\mu$, the surface of the aluminum silicate clay is saturated with hydrolyzable titanium compound, the dispersion contains 0.01-2% by weight, based on the filler, of organoaluminum compound selected from the group consisting of trialkylaluminums, dialkylaluminum hydrides, dialkylaluminum alkoxides and alkylaluminum halides, and the dispersion is contacted with olefin until a composite containing 20 to 70% polyolefin is formed.

24. The method of claim 22 in which the inorganic filler compound is alumina trihydrate having a weight-average equivalent spherical particle diameter of less than $50\mu$, the surface of the alumina trihydrate is saturated with hydrolyzable titanium compound, the titanium-treated alumina trihydrate is activated by heating at 100°-200° C., and the dispersion contains 0.01-2% by weight, based on the filler, of organoaluminum compound selected from the group consisting of trialkylaluminums, dialkylaluminum hydrides, dialkylaluminum alkoxides and alkylaluminum halides.

25. The method of claim 22 in which the inorganic filler compound having a neutral-to-acidic surface is selected from the group consisting of alumina hydrates, silicas, water-insoluble silicates, insoluble calcium phosphates, titania, zinc oxide, iron oxide, antimony trioxide and mixtures thereof and has a surface area of 0.01 to less than 100 m$^2$/g, the pigmentary oxide has a weight-average equivalent spherical particle diameter which is not more than half that of the titania-modified filler, and the dispersion is contacted with ethylene until a composite containing 15-60% by weight of polyethylene having an inherent viscosity of at least 8 is formed.

26. The method of claim 25 in which the inorganic filler compound having a neutral-to-acidic surface has a surface area of 0.5-50 m$^2$/g and a weight-average equivalent spherical diameter of 1-25$\mu$, the dispersion contains 0.002-0.2 millimole of organoaluminum compound per gram of filler, and the dispersion is contacted with ethylene until a composite containing 20-55% by weight of polyethylene having an inherent viscosity of at least 12 is formed.

27. The method of claim 26 in which the inorganic filler compound having a neutral-to-acidic surface is selected from the group consisting of aluminum silicate clays, alumina trihydrates and mixtures thereof.

28. The method of preparing a solid, homogeneous, particulate, highly-filled, polyolefin composite which comprises (A) dispersing
  (1) at least 1 weight/volume percent of finely-divided, inorganic filler compound having a neutral-to-acidic surface and a weight-average equivalent spherical particle diameter of less than 50 $\mu$, and
  (2) 0.001-1.0 millimole, per gram of filler, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1-10 carbons each, in an inert, liquid hydrocarbon diluent;

(B) adding to the resulting dispersion catalytically-active, hydrocarbon-soluble, organic, transition metal compound which contains substantially no halogen bonded to the transition metal and which is at least 50 times more active when adsorbed onto the surface of the filler than in solution in an amount equivalent to 0.00001-0.1 milligram-atom of transition metal per gram of filler;

(C) contacting the resulting dispersion with olefin selected from the group consisting of ethylene and mixtures of ethylene with one or more 1-alkenes of 3 to 10 carbons with agitation at a temperature of 0°-100° C. and a pressure from atmospheric to 500 atmospheres until a composite containing 10-75% by weight, based on the polyolefin and filler, of polyolefin selected from the group consisting of polyethylene and copolymers of ethylene containing up to 15% by weight of units derived from one or more 1-alkenes of 3 to 10 carbon atoms having an inherent viscosity of at least 2 is formed; and (D) isolating the resulting polyolefin/filler composite as a free-flowing powder.

29. The method of claim 28 in which the polymerization is carried out until a composite containing 10-70% by weight of polyolefin having an inherent viscosity of at least 4 is formed.

30. The method of claim 29 in which the inorganic filler compound has a surface area of less than 100 m$^2$/g and is selected from the group consisting of alumina hydrates, silicas and water-insoluble silicates, the dispersion contains 0.01-2% by weight, based on the filler, of organoaluminum compound, the organic, transition metal compound is selected from the group consisting of tetrabenzyltitanium, tetrabenzylzirconium and tetrabenzylhafnium, the transition metal compound reacts with the organoaluminum compound on the surface of the filler, and the dispersion is contacted with ethylene until 20-70% by weight of polyethylene is formed.

31. The method of claim 29 in which the inorganic filler compound has a weight-average equivalent spherical particle diameter of 0.1 to less than 50 $\mu$ and the mole ratio of organoaluminum compound to transition metal compound is 1000:1 to 4:1.

32. The method of claim 31 in which the inorganic filler compound is coated with an acidic oxide to provide an acidic surface.

33. The method of claim 31 in which the inorganic filler compound is selected from the group consisting of alumina hydrates, silicas, water-insoluble silicates, insoluble calcium phosphates, titania, zinc oxide, iron oxide, antimony trioxide and mixtures thereof and has a surface area of 0.01 to less than 100 m²/g, and the dispersion is contacted with ethylene until a composite containing 15–60% by weight of polyethylene having an inherent viscosity of at least 8 is formed.

34. The method of claim 33 in which the inorganic filler compound has a surface area of 0.5–50 m²/g and a weight-average equivalent spherical particle diameter of 1–25 μ, the dispersion contains 0.002–0.2 millimole of organoaluminum compound per gram of filler, and the dispersion is contacted with ethylene until 20–55% by weight of polyethylene having an inherent viscosity of at least 12 is formed.

35. The method of claim 34 in which the inorganic filler compound is selected from the group consisting of aluminum silicate clays, alumina trihydrates and mixtures thereof.

36. The method of claim 35 in which the organic, transition metal compound is tetraneophylzirconium.

37. The method of claim 28 in which hydrogen is also present in step (C), the hydrogen:olefin partial pressure ratio is 1:20 to 20:1, and the polymerization is carried out until a composite containing 30–75% by weight of polyolefin having an inherent viscosity of 2 to 6 is formed.

38. The method of claim 37 in which the olefin is ethylene, the ethylene partial pressure is 3–70 atmospheres, the hydrogen:ethylene partial pressure ratio is 1:5 to 5:1, and the polymerization is carried out until a composite containing 50–70% by weight of polyethylene having an inherent viscosity of 3 to 5 is formed.

39. The method of claim 38 in which the inorganic filler compound is coated with an acidic oxide to provide an acidic surface.

40. The method of preparing a solid, homogeneous, particulate, highly-filled, polyolefin composite which comprises
   (A) dispersing
      (1) at least 1 weight/volume percent of finely-divided, inorganic filler compound having a neutral-to-acidic surface and a weight-average equivalent spherical particle diameter of 0.1 to less than 50μ, and
      (2) the organoaluminum compound-transition metal compound complex formed by reacting
         (a) organoaluminum compound selected from the group consisting of trialkylaluminum, dialkylaluminum hydrides, dialkylaluminum alkoxides, alkylaluminum halides and polymeric hydrocarbylaluminums in which the alkyl groups, alike or different, have 1–10 carbons each with
         (b) catalytically-active, hydrocarbon-soluble, organic, transition metal compound which contains substantially no halogen bonded to the transition metal and which is at least 50 times more active when adsorbed onto the surface of the filler than in solution, in an amount sufficient to provide a mole ratio of organoaluminum compound to transition metal compound of 1000:1 to 4:1, in an amount equivalent to 0.001–1.0 millimole, per gram of filler, of organoaluminum compound and 0.00001–0.05 milligram-atom, per gram of filler, of transition metal in an inert, liquid hydrocarbon diluent;
   (B) contacting the resulting dispersion with olefin selected from the group consisting of ethylene and mixtures of ethylene and one or more 1-alkenes of 3 to 10 carbons with agitation at a temperature of 0°–100° C. and a pressure from atmospheric to 500 atmospheres until a composite containing 10–75% by weight, based on the polyolefin and filler, of polyolefin selected from the group consisting of polyethylene and copolymers of ethylene containing up to 15% by weight of units derived from one or more 1-alkenes of 3 to 10 carbons having an inherent viscosity of at least 2 is formed; and
   (C) isolating the resulting polyolefin/filler composite as a free-flowing powder.

41. The method of claim 40 in which the polymerization is carried out until a composite containing 10–70% by weight of polyolefin having an inherent viscosity of at least 4 is formed.

42. The method of claim 41 in which the inorganic filler compound is coated with an acidic oxide to provide an acidic surface.

43. The method of claim 41 in which the inorganic filler compound is selected from the group consisting of alumina hydrates, silicas, water-insoluble silicates, insoluble calcium phosphates, titania, zinc oxide, iron oxide, antimony trioxide and mixtures thereof and has a surface area of 0.01 to less than 100 m²/g, and the dispersion is contacted with ethylene until a composite containing 15–60% by weight of polyethylene having an inherent viscosity of at least 8 is formed.

44. The method of claim 43 in which the inorganic filler compound has a surface area of 0.5–50 m²/g and a weight-average equivalent spherical particle diameter of 1–25μ, the dispersion contains 0.002–0.2 millimole of organoaluminum compound per gram of filler, and the dispersion is contacted with ethylene until a composite containing 20–55% by weight of polyethylene having an inherent viscosity of at least 12 is formed.

45. The method of claim 44 in which the inorganic filler compound is selected from the group consisting of aluminum silicate clays, alumina trihydrates and mixtures thereof.

46. The method of claim 45 in which the organic transition metal compound is tetraneophylzirconium.

47. The method of claim 40 in which hydrogen is also present in step (C), the hydrogen:olefin partial pressure ratio is 1:20 to 20:1, and the polymerization is carried out until a composite containing 30–75% by weight of polyolefin having an inherent viscosity of 2 to 6 is formed.

48. The method of claim 47 in which the olfein is ethylene, the ethylene partial pressure is 3–70 atmospheres, the hydrogen:ethylene partial pressure ratio is 1:5 to 5:1, and polymerization is carried out until a composite containing 50–70% by weight of polyethylene having an inherent viscosity of 3 to 5 is formed.

49. The method of claim 48 in which the inorganic filler compound is coated with an acidic oxide to provide an acidic surface.

50. The method of forming articles from a solid, homogeneous, particulate, highly-filled, polyolefin composite which comprises subjecting the composite of claim 2 to a temperature at which the composite softens in the range of 105°–250° C. and a positive pressure of 10–100,000 psi.

51. The method of claim 5 in which sheets are formed by the process which comprises passing the composite along a continuous belt, subjecting the composite to a softening temperature of 150°–250° C. while it passes through a restricted space which compresses the composite against the belt at a pressure of 50–5000 psi without subjecting the composite to shearing forces, and removing the resulting sheet from the continuous belt after it passes through the restricted space.

52. The method of forming articles from a solid, homogeneous, particulate, highly-filled, polyolefin composite in which a sheet prepared in accordance with claim 51 is reformed by heating at a temperature of 105°–225° C. and pressing between a male die and a pad of elastomeric material.

53. The method of forming articles of claim 52 in which the pad of elastomeric material is an elastomeric diaphragm backed by a hydraulic fluid.

54. The method of forming articles from a solid, homogeneous, particulate, highly-filled, polyolefin composite in which a sheet prepared in accordance with claim 51 is reformed by cold stamping between matched metal molds at ambient temperature.

55. The method of forming articles from a solid, homogeneous, particulate, highly-filled, polyolefin composite in which a sheet prepared in accordance with claim 51 is reformed by hot stamping between matched metal molds at temperatures of 105°–250° C.

56. The method of forming articles of claim 50 which comprises placing the composite in a mold, compressing the composite at a pressure of 100–100,000 psi and a temperature below the melting point of the polymer, and removing the compressed composite from the mold and heating at a temperature above the softening point of the composite in the range of 105°–225° C.

57. The formed article obtained by the process of claim 50.

58. The formed article of claim 57 in the form of a film.

59. The formed sheet obtained by the process of claim 51.

60. The formed article obtained by the reforming process of claim 52.

61. The formed article obtained by the cold compressing and sintering process of claim 56.

62. The composite of claim 1 which is flame retardant and comprises
    (A) 10–70% by weight of polyolefin having an inherent viscosity of at least 4 selected from the group consisting of polyethylene and copolymers of ethylene containing up to 15% by weight of units derived from one or more 1-alkenes of 3 to 10 carbons polymerized onto
    (B) 30–90% by weight of finely-divided, inorganic filler compound, said filler compound being
        (1) 30–100% by weight of alumina trihydrate having a weight-average equivalent spherical particle diameter of less than 50$\mu$, and having interacted at its surface sufficient catalytically-active transition metal compound which contains substantially no halogen bonded to the transition metal to provide 0.000001–1.7 milligram-atom of transition metal per gram of filler,
        (2) 0–70% by weight of aluminum silicate clay having a weight-average equivalent spherical particle diameter of less than 50$\mu$ and being selected from the group consisting of
            (a) kaolinite, attapulgite and fuller's earth, said clay containing at least 0.05% by weight of titania, being free of promotion with added transition metal coordination catalyst component, and being dehydrated to less than 1 mole of aluminum silicate clay and
            (b) kaolinite, attapulgite, fuller's earth and bentonite, said clay having interacted at its surface sufficient catalytically-active transition metal compound which contains substantially no halogen bonded to the transition metal to provide 0.000001–1.7 milligram-atom of transition metal per gram of filler.

63. The composite of claim 62 in which the polyolefin is polyethylene.

64. The composite of claim 63 in which the surface of the alumina trihydrate is saturated with titania, the clay has a weight-average equivalent spherical particle diameter of less than 45$\mu$, and the clay having transition metal interacted at its surface has a surface which is saturated with titania.

65. The composite of claim 63 in which the finely-divided, inorganic filler compound is 100% alumina trihydrate.

66. The composite of claim 65 in which the polyethylene has an inherent viscosity of at least 12 and the composite is 45–80% alumina trihydrate.

* * * * *